US010438130B2

(12) United States Patent
Rossi et al.

(10) Patent No.: US 10,438,130 B2
(45) Date of Patent: Oct. 8, 2019

(54) COMPUTER-IMPLEMENTED SYSTEM AND METHOD FOR RELATIONAL TIME SERIES LEARNING

(71) Applicant: Palo Alto Research Center Incorporated, Palo Alto, CA (US)

(72) Inventors: Ryan A. Rossi, Mountain View, CA (US); Rong Zhou, San Jose, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 980 days.

(21) Appl. No.: 14/955,965

(22) Filed: Dec. 1, 2015

(65) Prior Publication Data

US 2017/0154282 A1 Jun. 1, 2017

(51) Int. Cl.
| | |
|---|---|
| *G06N 5/02* | (2006.01) |
| *G06K 9/00* | (2006.01) |
| *G06N 20/00* | (2019.01) |
| *G06K 9/46* | (2006.01) |
| *G06K 9/62* | (2006.01) |
| *G06N 20/10* | (2019.01) |

(Continued)

(52) U.S. Cl.
CPC ............. *G06N 20/00* (2019.01); *G06K 9/00* (2013.01); *G06K 9/00496* (2013.01); *G06K 9/00973* (2013.01); *G06K 9/469* (2013.01); *G06K 9/6273* (2013.01); *G06N 20/10* (2019.01); *G06N 5/003* (2013.01); *G06N 5/02* (2013.01); *G06N 20/20* (2019.01)

(58) Field of Classification Search
CPC .. G06K 9/00; G06K 9/00496; G06K 9/00973; G06K 9/469; G06K 9/6273; G06N 20/00
See application file for complete search history.

(56) References Cited

U.S. PATENT DOCUMENTS

| | | | |
|---|---|---|---|
| 10,242,258 B2* | 3/2019 | Guo ......................... | G06F 16/58 |
| 2013/0006991 A1* | 1/2013 | Nagano ................... | G10L 17/26 |
| | | | 707/737 |

(Continued)

OTHER PUBLICATIONS

Rossi et al., "Parallel Maximum Clique Algorithms with Applications to Network Analysis and Storage", Dec. 26, 2013, pp. 1-11 (Year: 2013).*

(Continued)

*Primary Examiner* — Paulinho E Smith
(74) *Attorney, Agent, or Firm* — Leonid Kisselev

(57) ABSTRACT

System and methods for relational time-series learning are provided. Unlike traditional time series forecasting techniques, which assume either complete time series independence or complete dependence, the disclosed system and method allow time series forecasting that can be performed on multivariate time series represented as vertices in graphs with arbitrary structures and predicting a future classification for data items represented by one of nodes in the graph. The system and methods also utilize non-relational, relational, temporal data for classification, and allow using fast and parallel classification techniques with linear speedups. The system and methods are well-suited for processing data in a streaming or online setting and naturally handle training data with skewed or unbalanced class labels.

20 Claims, 11 Drawing Sheets

(51) Int. Cl.
    *G06N 5/00*     (2006.01)
    *G06N 20/20*     (2019.01)

(56) References Cited

U.S. PATENT DOCUMENTS

2017/0154282 A1*   6/2017   Rossi ..................... G06K 9/00
2018/0307995 A1*   10/2018   Conroy ................ G06N 20/00

OTHER PUBLICATIONS

Rossi et al., "Scalable Relational Learning for Large Heterogenous Networks", 2015, pp. 10 (Year: 2015).*
Getoor, L., & Taskar, B. (2007). Introduction to Statistical Relational Learning. MIT press.
Rossi, R. A., McDowell, L. K., Aha, D. W., & Neville, J. (2012). Transforming graph data for statistical relational learning. Journal of Artificial Intelligence Research, 45(1), 363-441.

* cited by examiner

COMPUTER-IMPLEMENTED SYSTEM AND METHOD FOR RELATIONAL TIME SERIES LEARNING

FIELD

This application relates in general to prediction (classification and regression), and in particular to a computer-implemented system and methods for relational time series learning.

BACKGROUND

Determining a classification associated with an entity, such as a person, an organization, an object, or an organization can have tremendous importance and numerous applications. For example, if upon admission to a hospital, a person can be classified as having certain risk factors for developing certain diseases, the risk factors can be used during diagnosis of that person's medical conditions. Of a similar value can be the prediction of the class label of an entity or an object in the future, with the knowledge of the future predicted class label to allow for the planning of the future (e.g., forecasting tasks). Such tasks are commonly accomplished by separate families of techniques. For example, traditional time series forecasting focuses on predicting the value of a future point in a time series. Similarly, one of the goals of relational learning, also known as statistical relational learning, is classifying an object based on the object's attributes and relations to other objects.

While the two families of techniques can be applied to data represented as a graph, the techniques have drawbacks that limit their usefulness. For instance, traditional time series forecasting techniques, such as those described in Box, G. E., G. M. Jenkins, and G. C. Reinsel. "Time Series Analysis: Forecasting and Control." John Wiley & Sons (2013), the disclosure of which is incorporated by reference, only consider a single time series. In the context of data represented as a graph, such techniques consider only a single node of the graph, representing a single entity, without considering edges that represent the connections of that entity to other entities. In other words, these techniques assume independence among the time series. Multiple possible reasons exist for this approach, such as the amount of observed data being limited and only a single time series being available. Further, in many situations, the dependence between the time series is unknown or unobservable. For example, such dependence may not be observable when data points in a time series are collected independently from each other, such as when the data points represent distinct variables such as wind speed and temperature.

Likewise, traditional multivariate time series forecasting techniques, which account for interrelatedness of time series, also have limited use. Most of the existing models are based on a fundamental assumption that the time series being processed are pairwise dependent or strongly correlated with each other. Thus, these models assume that the each of the time series represents a node in a graph and each node has an edge to every other node in the graph, forming a clique of the size of the number of nodes in the graph. When the assumption is incorrect, the results produced by such techniques can be inaccurate.

On the other hand, statistical relational learning techniques, such as those described by Taskar, Ben, and Lise Getoor "Introduction to statistical relational learning," MIT Press (2007) and Rossi, Ryan A., et al. "Transforming graph data for statistical relational learning." Journal of Artificial Intelligence Research 45.1 (2012): 363-441, the disclosures of which are incorporated by reference, generally focus on static graphs, graphs representing connections between entities at a single time point and ignore any temporal relational information. Such techniques cannot predict a future classification of an entity represented by a node in a graph.

Accordingly, there is a need for a way to be able to assign a classification at multiple time points to a data item included as part of multiple type of graphs. There is a further need for improved ways to perform relational and non-relational classification of data items.

SUMMARY

Relational time series forecasting is a task at the intersection of traditional time series forecasting and relational learning, having the potential to allow predicting the classification of a data item at a plurality of time points. Unlike traditional time series forecasting models that are built for single time series data or multi-variate time series data and which assume either complete time series independence or complete dependence, the system and methods described below allow time series forecasting to be performed on multivariate time series represented as vertices in graphs with arbitrary structures as well as the prediction of a future class label for data points represented by vertices in a graph. The system and methods also utilize non-relational, relational, temporal data for classification, and allow using fast and parallel classification techniques with linear speedups. The system and methods are well-suited for processing data in a streaming or online setting and naturally handle training data with skewed or unbalanced class labels. In addition, the system and method can process both sparse and dense matrix data.

A class of (parallel) systems and methods for relational time series classification are provided. In one embodiment, a computer-implemented system and methods for relational time series learning are provided. A plurality of training data items are maintained, each of the training data items associated with one of a plurality of labels. An incoming stream is received that includes one or more unlabeled data items; attributes of a plurality of training data items are normalized. At least one of the unlabeled data items received is processed using a plurality of processing units executed by one or more processors, each of the units associated with a private vector, the processing including: initializing the private vectors; normalizing attributes of the unlabeled data item; calculating by the processing units a similarity score between the unlabeled data item and one or more of the training data items using a similarity function and storing each of the scores into the private vector associated with each of the processing units; summing the scores from all of the private vectors into a storage vector; and assigning the label associated with the largest score as the label of the unlabeled data item.

In a further embodiment, a computer-implemented system and method for relational classification via maximum similarity is provided. An incoming stream that includes one or more unlabeled data items, each associated one or more initial attributes. A plurality of training data items are maintained, each of the training data items associated with one of a plurality of labels and associated with one or more initial attributes. Additional attributes are derived for each of the training data items based on the initial attributes and are added to the initial attributes to obtain attributes of the training data items. The attributes of the plurality of the training data items are normalized. A graph is created that includes a plurality of vertices, each of the vertices representing one of the unlabeled data items and the training data items. One or more of the unlabeled data items are processed using a plurality of processing units executed by one or more processors, each of the units associated with a private vector, the processing including: identifying those of the training data items whose representations are within k-hops of the representations of that unlabeled data item; initializing the private vectors; deriving additional attributes of that unlabeled data item based on the initial attributes of that unlabeled data item; adding the additional attributes to the initial attributes to obtain attributes of that unlabeled data item; normalizing attributes of the unlabeled data item; calculating by the processing units a similarity score between the unlabeled data item and each of the training data items using a similarity function and storing each of the scores into the private vector associated with each of the processing units; weighing the similarity scores, wherein the similarity scores between that unlabeled data item and those of the training data items that are within the k-hops of that unlabeled data item are weighed heavier than the similarity scores between that unlabeled data item and those of that are training data items that are not within the k-hops; summing the weighed scores from all of the private vectors into a storage vector; and assigning the label associated with the largest score as the label of the unlabeled data item.

In a still further embodiment, a computer-implemented method for relational time series learning is provided. An incoming stream is received that includes one or more unlabeled data items, each associated with data regarding initial attributes of the unlabeled data items and connections of the unlabeled data items at a plurality of time points. A plurality of training data items are maintained, each associated with data regarding initial attributes of that training data item and connections of that training data items at the plurality of the time points. A plurality of adjacency matrices are obtained, each of the matrices representing a graph comprising a plurality of vertices connected by one or more edges, each of the vertices representing one of the unlabeled data items and the training data items, each of the graphs further representing the connections between the training data items and the unlabeled data items at one of the time points. A weight is associated with each of the edges of each of the graphs based on the time point associated with that graph and combining the representations of the graphs with the weighted edges to create a representation of a summary graph. Additional attributes for each of the training data items at each of the time points based on the initial attributes of that training data items at that time point. The additional attributes of each of the training data items are added to the initial attributes of that training data item to obtain attributes of that training data item at each of the time points. Additional attributes are derived for each of the unlabeled data items at each of the time points based on the initial attributes of that training data items at that time point and are added to the initial attributes of that unlabeled data item to obtain attributes of that unlabeled data item at each of the time points. The attributes of the training data items and the unlabeled data items for all of the time points are smoothed and the smoothed attributes of the training data items are normalized. Those of the training data items whose representations are within k-hops of the representations of each of the data items in the summary graph are identified. At least one of the unlabeled data items is processed using a plurality of processing units executed by one or more processors, each of the units associated with a private vector, including: initializing the private vectors; normalizing attributes of the unlabeled data item; calculating in parallel by the processing units a similarity score between the unlabeled data item and one or more of the identified training data items using a similarity function and storing each of the score into the private vector associated with each of the processing units; weighing the similarity scores, wherein the similarity scores between that unlabeled data item and those of the training data items that are within the k-hops of that unlabeled data item are weighed heavier than the similarity scores between that unlabeled data item and those of that are training data items that are not within the k-hops; summing the weighted scores from all of the private vectors into a storage vector; and predicting the label associated with the incoming data item based on the scores associated with the label at a future point of time.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

While the system and method described below focus on assignment and prediction of labels for data items, the techniques described below could also be used for regression.

Figure 1:
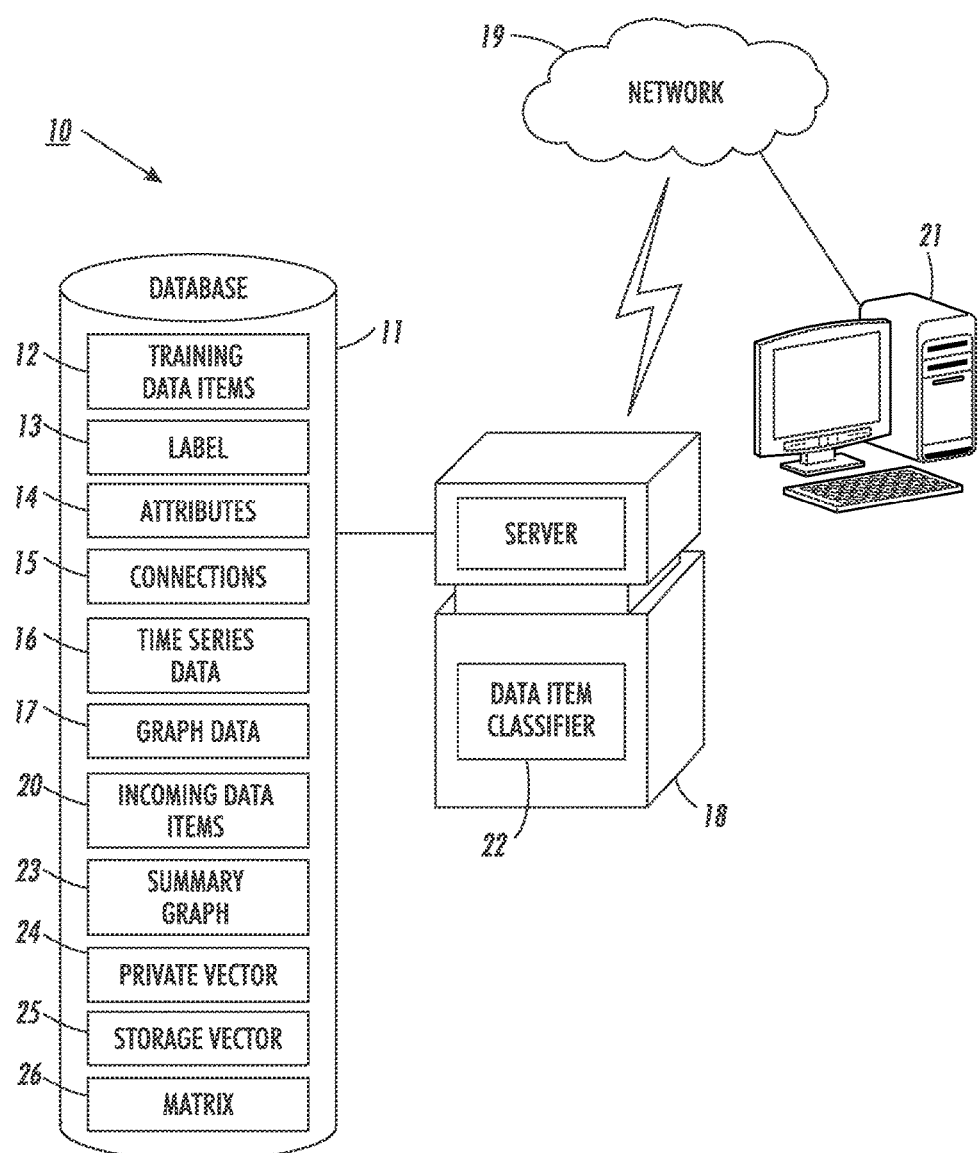
FIG. 1 is block diagram showing a computer-implemented system for parallel maximum similarity classification in accordance with one embodiment.

FIG. 1 is block diagram showing a computer-implemented system 10 for parallel maximum similarity classification in accordance with one embodiment. The system 10 includes a database 11 that stores a plurality of training data items 12, also referred to as training objects or training instances below. For example, each of the training data items 12 can be a name or another identifier of a person or another entity, such as an organization, in the database. The data item 12 can also be a vector that includes one or more numerical values. Each of the training data items 12 is associated with one of a plurality of labels 13, with each label identifying a class to which the training data item belongs, the labels being stored in the database 11. For example, a label 13 can be identify a person with a certain medical condition or a person belonging to a particular group in a social network, though other examples are also possible. Each of the training data items 12 is further associated with one or more attributes 14 (also referred to as "features" in the description below"), with each of the attributes being a characteristic of the training data item 12. For example, an attribute 14 can be an age of the person whose name is identified by the training data item 12. An attribute 14 can also relate to a connection that an entity represented by the training data items 12 has to another entity (represented by the training data item or an incoming data item 20), such as a number of e-mails that a person sent to another person.

In one embodiment, the training data items 12 and at least some of the attributes 14 are represented in the database 11 as a matrix 26 that can be used in subsequent analysis, with the rows being the training data items and the columns representing the attributes 14 of the data items. In one embodiment, the training data items 12 that are included into the matrix can be preexisting. In a further embodiment, the training data items 12 can be sampled from a continuous stream of incoming data items 20, described in detail below, reviewed and labeled by a human reviewer. Only reviewed data items that are representative of the characteristics of the stream, of the attributes 14 of the data items 20 in the stream, can be chosen to be included in the matrix 26, with the reviewer deciding whether a training data item 12 is representative of the stream.

Further, to minimize the use of the human reviewer's time, a minimum number of training data items can be chosen for the matrix 26. In a further embodiment, a vertical binning or hashing function can be used to determine sample the data items 20, determine whether to keep a sampled data item, and removing those sampled data items 12 that are not representative of the characteristics of incoming data items 20 in the stream. In a still further embodiment, all of the available training data items can be included in the matrix 26.

In a still further embodiment, to reduce the computational resources, given a potentially large training set represented as a matrix 26 with the training data items, denoted as $X \in \mathbb{R}^{m \times f}$ a much smaller set $X_R \in \mathbb{R}^{h \times f}$ where $h < m$ such that $X_R$ is a representative set of the much larger matrix X, m is the number of training data items 12, and f is the number of attributes 14 of the training data items. A clustering technique (such as k-means, though other techniques are possible) can be used to compute a minimal set of representative similarity vectors $mR \in \mathbb{R}^{h \times f}$. In the clustering technique, the number of clusters to be made is set as $k=|C|$, the number of unique class labels in the data. After clustering the data, a representative set of training data items $X_R$ can be obtained in a variety of ways. For example, each k cluster can be sampled proportionally to the size of the cluster and use these as a representative set. Alternatively, centroids of the clusters can be used as the representative similarity vectors. Alternatively, the distance from the training data items 12 in each cluster and the centroid of that cluster can be computed. Multiple training data items in a cluster that are of varying of varying distances from the assigned centroid can be selected as representative of that cluster, which can be quickly accomplished using a vertical binning procedure. If k-means is used as the clustering technique, these distances can be output without performing additional calculations. Still alternatively, coordinate descent matrix factorization techniques may also be used to cluster or find representative similarity vectors.

The database 11 can further store information regarding connections 15 between the training data items 12 and the connections 15 between a training data item and an unlabeled data item 20 in need of classification at one or more time points. Connections 15 can also be stored between unlabeled data items, as further described below. For example, such connections 15 can represent two people, being connected in a social network or having exchanged e-mails. The connections 15 can be represented in graph data 17, which can include either at least one of a graph or an adjacency matrix representing the graph, with the training data items 12 being represented as the nodes (also referred to as vertices) of the graph and the connections 15 being represented as the edges of the graph. In the description below, when reference is made to obtaining or processing a graph, in a further embodiment, the adjacency matrix representing the graph is instead obtained and processed.

The connections 15, and correspondingly the edges of the graph, are associated with the attributes of the training or incoming data items 20 that describe the connections of the entities represented by those data items 12, 20 to other entities represented by other data items 12. In one embodiment, the graph data 17 can be stored using edge-based compressed sparse column format, though other ways to store the graph data 17 are possible. The database 11 can further store the information about the connections 15 and the attributes 14 throughout a plurality of time points ("time series data" 16), and thus the time series data 16 can include graph data 17 representing the training data items 12 and the connections 15 between them throughout the time points.

The database 11 is connected to one or more servers 18 that are in turn connected to a network 19, which can be an Internetwork, such as the Internet or a cellular network, or a local network. Over the network 19, the servers 18 can receive, as mentioned above, a continuous stream of one or more incoming, unlabeled data items 20 from one or more computing devices 21. In the description below, the incoming data items 20 are also referred to as testing objects or testing instances. The received data items 20 can be stored in the database 11.

The stream includes a plurality of incoming data items 20 arriving one after another, with the servers 18 being capable of processing the incoming data items 20 in real time in the order of their arrival. While shown as a desktop computer, the computing devices 21 can include laptop computers, smartphones, and tablets, though still other computing devices. The incoming data items are not labeled: not associated with one of the labels 13. Similarly to the training data items 12, the unlabeled data items 20 can be an identifier of a person or another entity, such as a name, though other kinds of unlabeled data items 20 are possible.

The incoming data items 20 are also associated with one or more attributes 14. In one embodiment, the attributes 14 associated with the incoming data items 20 are the same as the attributes 14 associated with the training data items. In a further embodiment, the incoming data items 20 can have attributes that are not associated with the training data items 12. Each of the incoming data items 20 are also associated with connections 15 to one or more of the training data items, such as connections in a social network. Further, associated with each of the incoming data items 20 can be the time series data 16 that includes information about the attributes 14 of the incoming data items 20 and the connections 15 of the incoming data items to the training data items through the plurality of time points. The received set of incoming data items 20 can also be represented as a matrix 26, denoted as Z, in which m rows represent the incoming data items 20 and f columns represent the features. Each incoming data item 20 can also be associated with connections 15, either to the training data items 12 or other unlabeled data items 20.

The one or more servers 18 execute a data item classifier 22 that can classify each of the incoming data items 20 with one of the labels 13. The classifier 22 can perform the classification in accordance with one of the methods described below beginning with reference to FIGS. 2A-2B. Table 1 presents some of the notations used in the classification techniques used by the classifier 22 and described below. In Table 1, matrices are shown as bold, upright roman letters; vectors are shown as bold, lowercase Roman letters; and scalars are unbolded Roman or Greek letters. Indexed elements are vectors/matrices if bolded, or scalars if unbolded.

TABLE 1

| Symbol | Description |
| --- | --- |
| n | number of training objects |
| f | number of features (columns) |
| $\mathcal{L}$ | Set of class labels for the nodes, $|\mathcal{L}|$ is the number of unique class labels |
| X | n × f rows are training objects and columns are features |
| Z | m × f testing objects, same as above |
| y | vector of class labels for the training set |

One approach that the classifier 22 can use to classify the incoming data item 20 is using parallel maximum similarity classification, described in detail below with reference to FIGS. 2A-2B. Briefly, the classifier 22 normalizes the attributes of the training data items 12 and the incoming data items 20, and calculates using a similarity function a similarity score between each of the unlabeled data items 20 and each of training labeled data items 12 based on the attributes of the unlabeled data item and the training data items 20. The normalization can be done in a variety of ways, including as further described below with reference to FIG. 6, though other ways are still possible. The comparison of each of the training data items 12 to an incoming data item 20 is performed by a separate processing unit in the one or more servers 18. Each of the units is associated with a private vector 24, which stores the similarity scores calculated for the training data item 12 by that processing unit. A separate bin in the private vector 24 stores the score calculated from comparison to each of the incoming data items 20 to the training data items 12. After the scores are calculated and stored in the private vectors 24, the classifier 22 sums up the scores for each of the incoming data items 20 across all of the private vectors 24. The summation includes adding together the scores from comparison of that incoming data item 20 to the training data items 12 that have the same label 13, resulting in a score for each of the labels 13. The scores for the labels 13 for each of the incoming data items can be stored in a storage vector 25. The label 13 with the highest score for the incoming data item is assigned as the label 13 of that incoming data item 20.

As mentioned above, the comparison of the training data items 12 to the incoming data items 20 is done by separate processing units, with one unit comparing one training data item to the incoming data items 20. The processing by the units is done in parallel, with the units working at the same time, which allows to reduce the time necessary for the processing. During the processing, a block of contiguous rows of the matrix representing the training data item set is assigned to one unit.

The classifier 22 can employ a variety of similarity functions in calculating the similarity scores 21. For example, the similarity function can be the radial basis function. Given two vectors, $x_i$, which represents one of the training data items 12, and $z_j$, representing one of the incoming data items, the similarity function is expressed as:

$$S(x_i, z_j) = \exp\left(-\frac{\|x_i - z_j\|_2^2}{2\sigma^2}\right),$$

where the radius of the RBF function is controlled by choice of $\sigma$ (i.e., tightness of the similarity measure).

Similarly, a polynomial function can be used as the similarity function for training and incoming vectors of uniform length. Thus, $$S(X, Z) = \|X, Z\|^n$$

The classification using a similarity function can be expressed as follows. A matrix 26 $X \in R^{m \times n}$ represents the complete set of training data items 12, where the rows represent training data items 12 and the columns represent attributes 14 of the data items. The ith row of X is represented by the vector $x_i \in R^n$:

$$X = \begin{bmatrix} \vdots \\ x_i \\ \vdots \end{bmatrix}$$

Given a set of incoming data items 20, denoted as Z, then the class of a single incoming data item 20, $z_j$, is predicted as follows. First, the similarity of $z_j$ with respect to each training example in X is computed. For instance, suppose $x_i$ belongs to class $k \in C$, then $S(x_i, z_j)$ is added to the kth element of the weight vector w. The similarity of the instances in X of class k with respect to the test object $z_j$ is formalized as, $$w_k = \sum_{x_i \in X_k} S(x_i, z_j)$$

where $X_k$ is the set of training objects from X of class k. Thus w is simply, $$w_k = \left[\sum_{x_i \in X_1} S(x_i, z_j) \ldots \sum_{x_i \in X_k} S(x_i, z_j) \ldots \right]$$

After computing w, then $z_i$ is assigned the class that is most similar over the training instances in X.

$$\xi(z_i) = \max_{k \in C} w_k$$

Also note that if Z is represented as a sparse matrix of incoming data items 20 and their attributes 14, then, in one embodiment, the values in the set Z can be hashed using a perfect hash function, allowing to test similarity between only the nonzero elements in Z and X, though in a further embodiment, other functions can be used to create the hash values. For real-time systems an even faster approximation may be necessary; in this case, one may compute the centroid from the training examples of each class, and compare the centroid to the incoming data items instead of all of the training data items 12 in the same class. If there are k classes, then the complexity for classifying a test point is only O(nk) where n is the number of columns (features) of X.

The complexity for both sparse and dense training set $X \in \mathbb{R}^{m \times f}$ is given below for the system in accordance with one embodiment. In a further embodiment, other complexities can be used. If X is a sparse data set and stored as a sparse matrix using compressed sparse column/row format, let t $\Omega_X^{\Omega_X}$ denote the number of non-zeros in X, then the cost of a single test example is $O(|\Omega_X|)$ linear in the number of non-zeros in X. Further, let p be the number of processors, then the complexity is only $O(|\Omega_X|/p)$, and hence is very scalable for real-time systems. If X is a dense matrix, given a dense training set $X \in \mathbb{R}^{m \times f}$ (having few zeros), the computational cost of the classifier is O(mf) (for each test object), thus it takes O(mf/p) for p processors. The cost may also be significantly reduced by selecting a representative set of training objects, as described above.

Figure 3A:
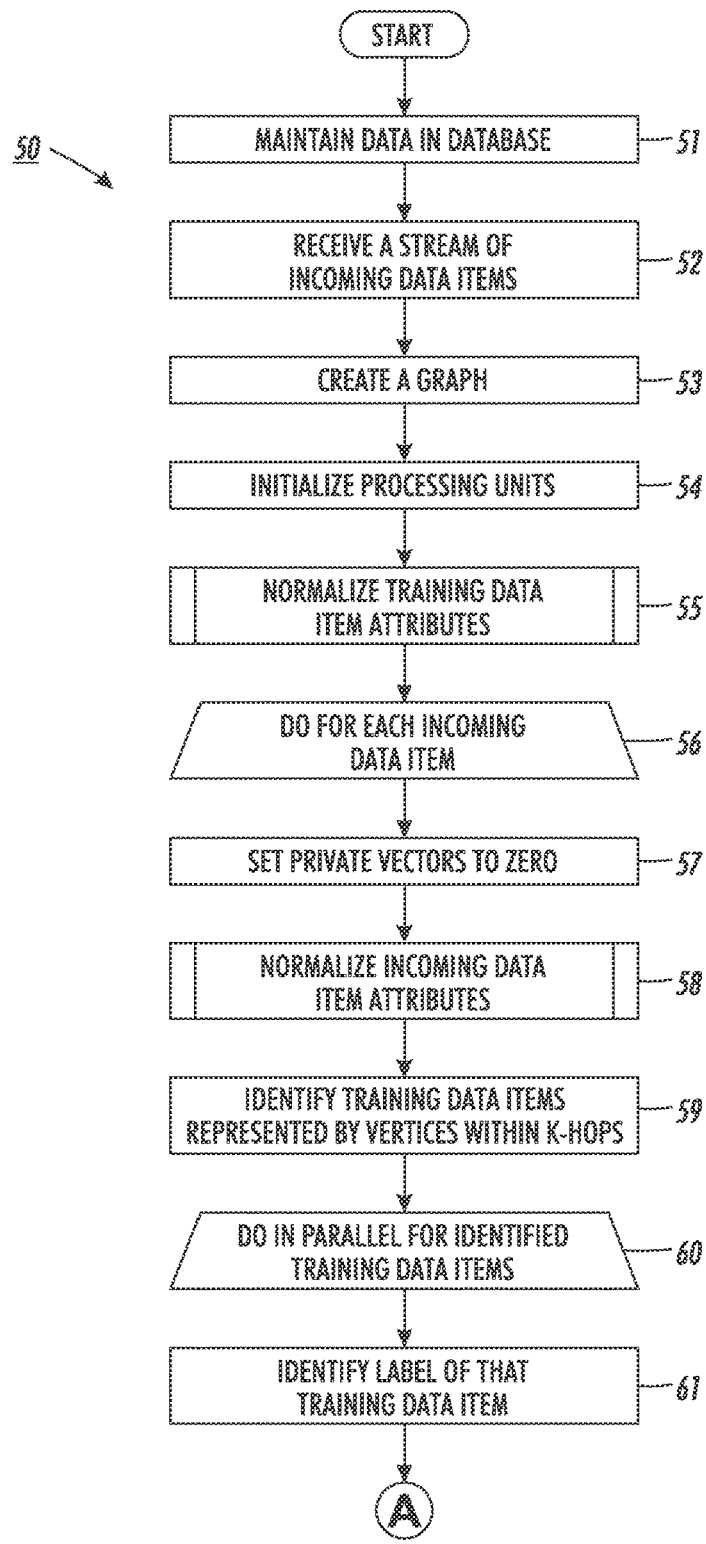
FIG. 3A-3B are flow diagrams showing a method for graph-based classification via maximum similarity in accordance with one embodiment.
Figure 3B:
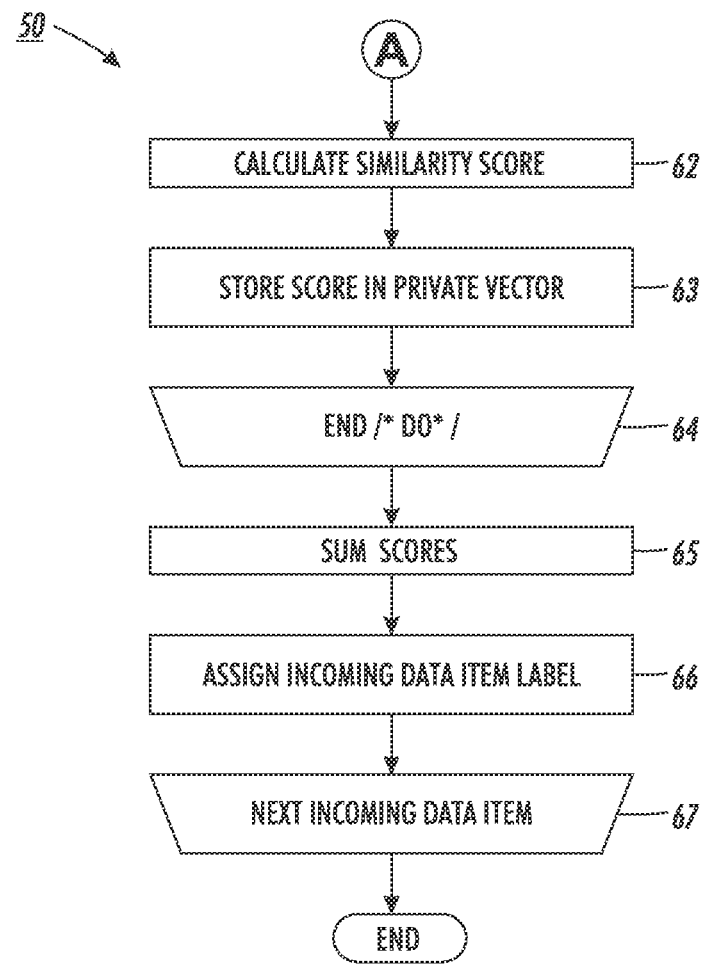

If an incoming data item 16 has connections 15 to the training data items 12, the classifier can also perform graph-based classification via maximum similarity, as further described with reference to FIGS. 3A-3B. Briefly, similarly to the maximum similarity classification described above, the attributes 14 of the training data items 12 and the incoming data items 20 are normalized. Before comparing the training data items 12 to the incoming data items 20, the classifier 22 builds the graph data 17, the graph or the adjacency matrix representing the graph or both, using the connections 15, with each of the nodes of the graph representing one of the training data items 12 or one of the incoming data items 20. The graph data 17 can be constructed in a variety of ways. For example, the graph data 17 can be constructed using a measure, such as a kernel function or a distance function, as is done in graph-based supervised learning. The graph can be observed directly, such as through observation of evolution of a social network over time, such as described in Rossi, Ryan A., et al. "Transforming graph data for statistical relational learning." Journal of Artificial Intelligence Research 45.1 (2012), 363-441, the disclosure of which is incorporated by reference. Still other ways to build or obtain the graph data 17 are possible.

The classifier 22 identifies a neighborhood of vertices representing training data items 12 that are within a certain distance of the vertex v representing the incoming data item 20 that is being classified. The neighborhood is denoted as $N_k(v)$, with v denoting the vertex representing the incoming data item 20 and k denoting the distance, with the distance being measured in "hops," each hop being one edge in the graph. Thus, when k=1 and the neighbors are within 1-hops of the vertex v, the neighborhood includes those of vertices that are adjacent, directly connected, to the vertex v representing the incoming data item 20. Similarly, if k=2 and the neighborhood includes vertices that are within 2 hops of the vertex v, the neighborhood includes the vertices adjacent to the vertex v and the vertices that are connected by an edge to the adjacent vertices. Unless otherwise specified in the description below, k=1.

For the incoming data items that have the connections 15 with the training items and are thus connected by edges in the graph, the classifier calculates the similarity scores between one of the incoming data items 20 and the training data items 20 that are within the k-hops of that incoming data item in the graph 17. The scores, saved into private vectors 24, as described above, are summed up, with the scores for each label 13 being stored into the storage vector 25, and the label 13 with the highest score is selected as the label 13 of the incoming data items. If there are no connections 15 available between an incoming data item 20 and one of the training data items 20, the label of the incoming data item is determined as described above with reference to the parallel maximum similarity classification.

While in the techniques described above the classifier 22 uses pre-existing attributes 14 for determining similarity between the incoming data items 20 and the training data items 12, the classifier 22 can also analyze these initial attributes 14 to identify additional attributes 14 of the incoming data items 20 and the training data items 12 as part of relational classification via maximum similarity. For example, if an attribute 14 associated with a training 12 or an incoming data item 20 is an age of an individual, an additional attribute could describe an average age of individuals represented by a data items that are connected to a particular training 12 or incoming data items 20. The additional attributes are added to the initial attributes, creating total attributes of the data items 12, 20, and the total attributes of the data items 12, 20 are used to calculate the similarity scores. The technique is called relational classification due to the underlying assumption that the attributes 14 and the class labels 13 of the vertices connected in the graph are correlated, and the features improve the assignment of the labels 13.

The relational classification techniques can be used either for non-graph based classification, such as described above and below with reference to FIGS. 2A-2B, or for graph-based classification, such as described below with reference to FIGS. 4 and 5.

In a further embodiment, the same data used to make the relational classification can be used to improve the results of the relational classification using collective classification. In performing the collective classification, instead of making a final label 13 assignment using the relational data, the label 13 assignments of the majority of the incoming data items undergo revision. At each iteration, the classifier 22 only assigns the class labels of only a portion, such 10%, though other percentage are possible, of incoming data items 20 represented by the nodes, with the classification of the 10% being predicted with the greatest confidence. The assignments of this portion of incoming data items 20 are confirmed and the data items 20 with the assignments are added to the set of training data items and are used for classification of the remaining unlabeled data items 20 during subsequent iterations.

The confidence may be predicted in a variety of ways. The most straightforward approach is to simply use the similarity score vector c (after the similarity is computed between each of the training instances). At this point, we may normalize vc, the score for a vertex, as follows:

$$p = c / \Sigma C_k,$$

where ck is the total similarity score for the kth label and c is the vector of similarity scores for the $|\mathcal{L}|$ class labels. Hence, $\Sigma p_k = 1$ and thus $p_k$ is the probability that $v_j$ belongs to the class k, and thus can be used as a measure of confidence. For instance, suppose $|\mathcal{L}|=3$ class labels, and let p=[0.33 0.33 0.34]. In this case, the technique described above would predict the class of $v_j$ as k=3. In this case, p provides a measure of uncertainty in the prediction, as all class labels are almost equally likely. However, the most frequent case that is observed has the following likelihoods: p=[0.99 0.001 0.099]. In this case, the confidence in the prediction is high. Additionally, in a further embodiment, the classifier 22 may use entropy to measure uncertainty. The advantage of this approach is mainly in the ability to label nodes where the neighbors are also unlabeled, such as in graphs that are sparsely labeled.

Figure 5A:
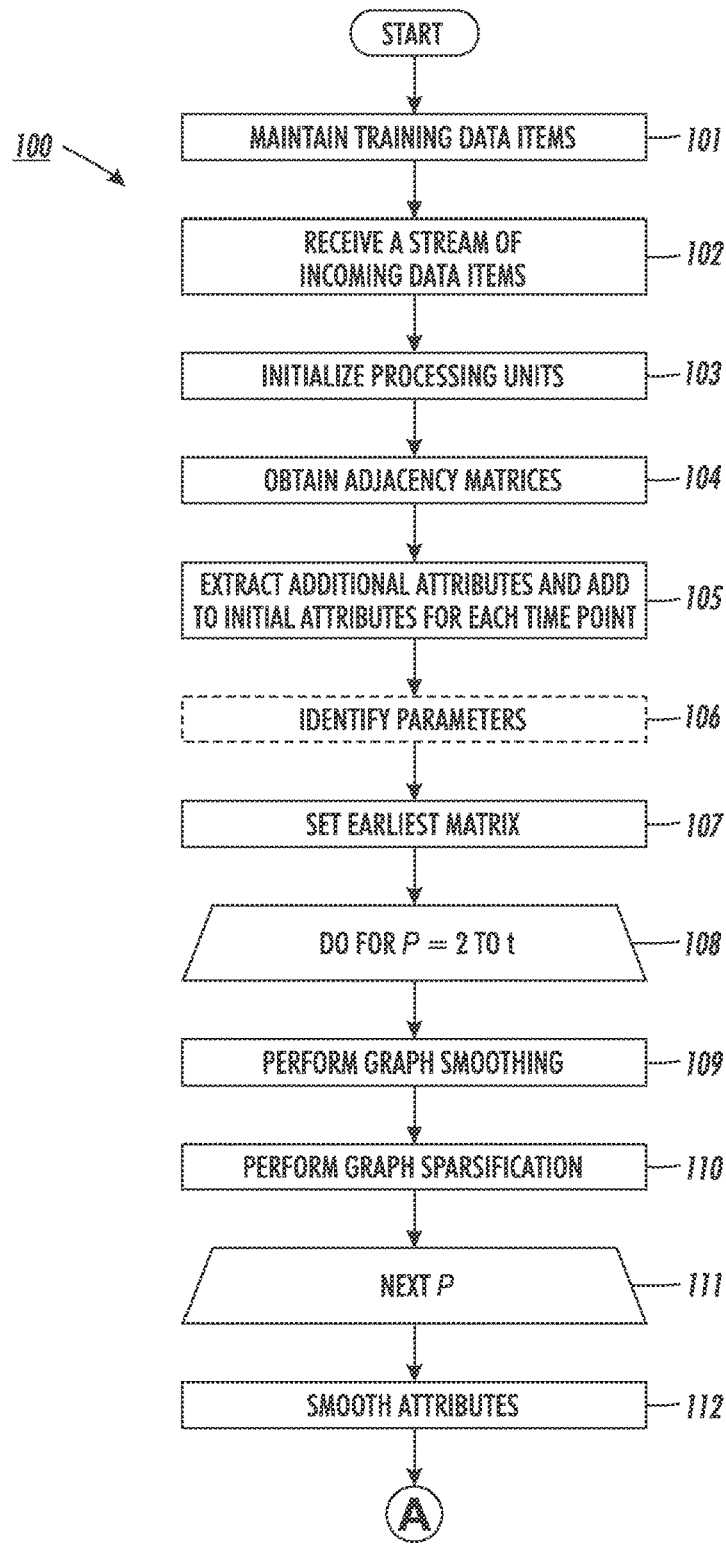
FIG. 5A-5C are flow diagrams showing a method for relational for relational time series learning in accordance with one embodiment.
Figure 5B:
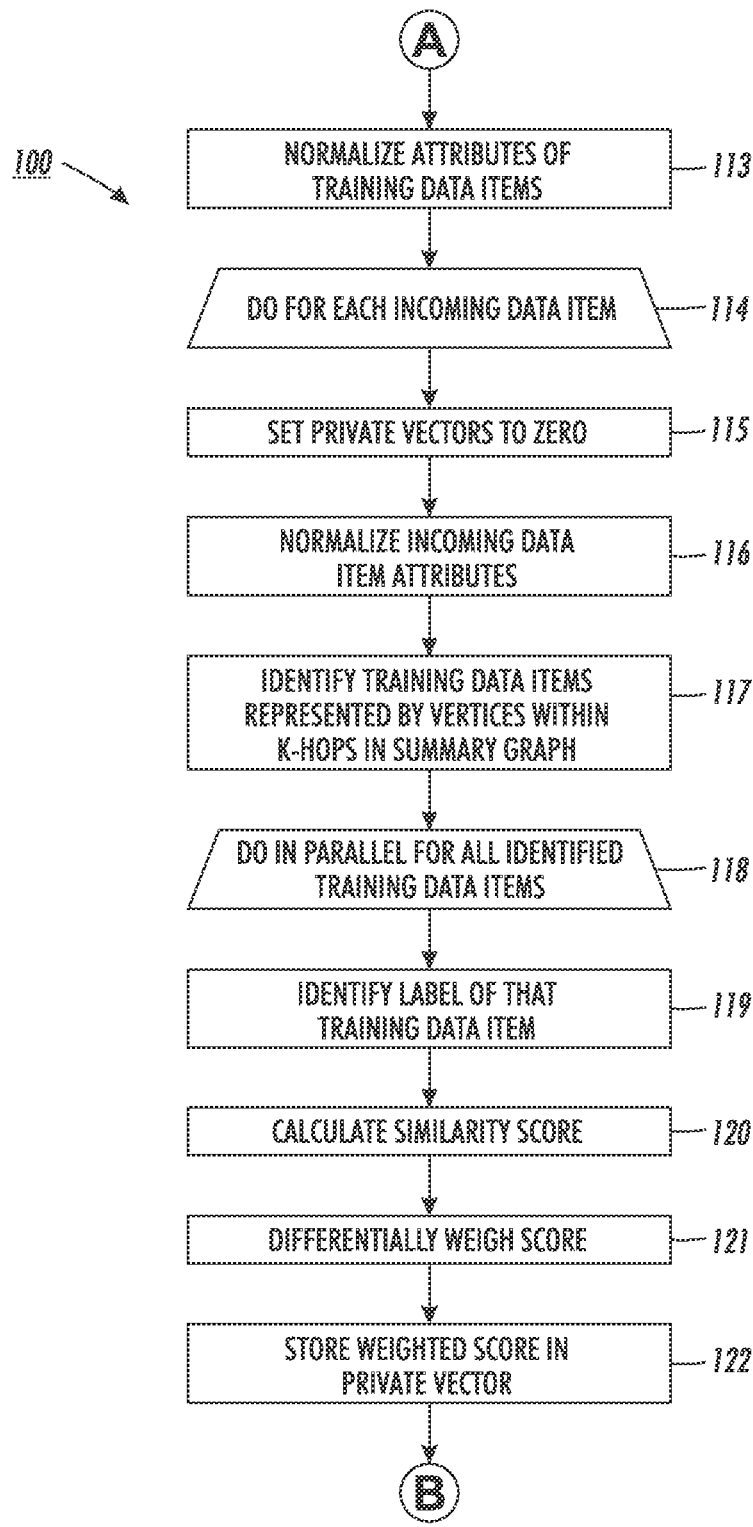
Figure 5C:
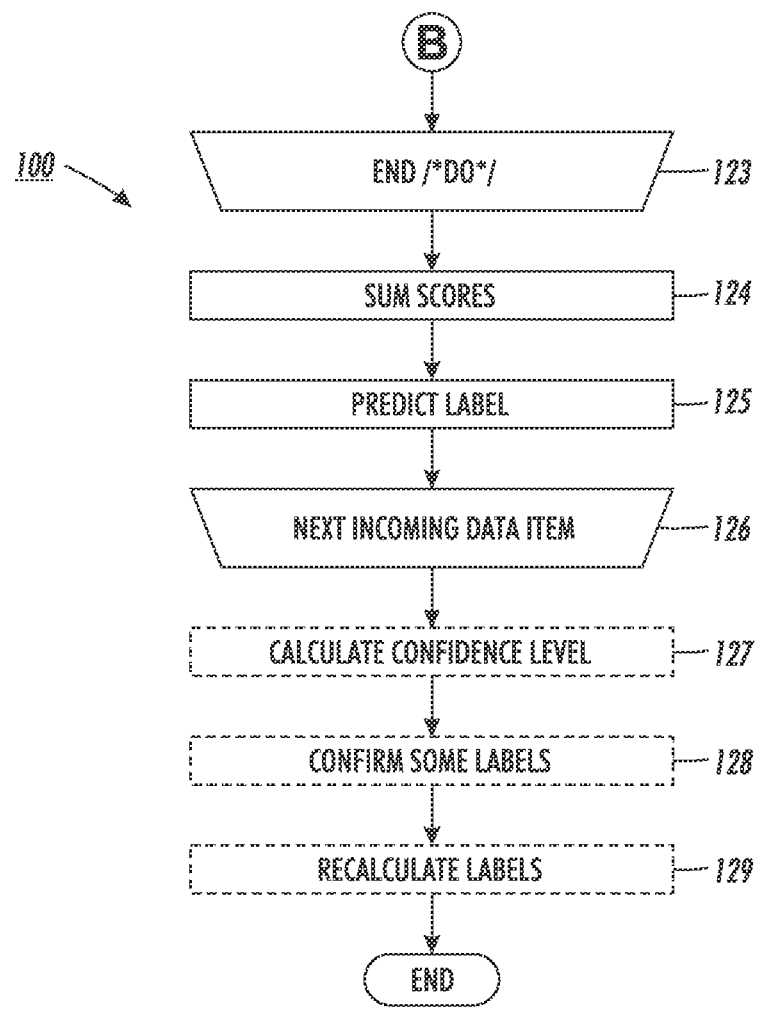

The classifier 22 can also use the time series data 16 to predict the future class label of the incoming data items 20 via relational time series prediction, as further described below with reference to FIGS. 5A-5C, as well as to assign a present label 13 to the incoming data item 20. As also described below, as the method described with reference to FIGS. 5A-5C takes into account the age of the data used to make the label assignment, the assignment can also serve as a prediction that the label 13 will remain the same for a certain period of time. The time series data 16 can include graph data 17, a plurality of adjacency matrices representing graphs that show the connections 15 between the training data items 12 and the incoming data items 20 through the plurality of time points. The time series data 16 further includes the attributes 14 of the data items 12, 20 represented by the vertices through multiple time points. The classifier 22 can process the graph data 17 using a variety of processing kernels to perform graph smoothing: weigh the graphs based on the time points to which the graphs correspond and combine weighed the graphs to create a summary graph 23, with the summary graph 23 being a summarization of the graphs. The graph smoothing and the creation of the summary graph is performed using the adjacency matrices representing the graphs, as described below with reference to FIGS. 5A-5C. The classifier 22 can use the same kernels to smooth the attributes of the data items 12, 20 throughout multiple time points, though other kernels can also be used. Similarly to graph smoothing, the attributes smoothing assigns weights to the attributes based on the time points with which the attributes are associated.

Formally, the relational time series prediction can be defined as follows. The time series data 16 can be represented as a time series G, a time series of relational data (graphs and attributes), which includes a sequence of a sequence of attributed graphs where $\mathcal{G}=\{G_1, G_2, \ldots, G_p, \ldots, G_{t-1}, G_t, \ldots\}$.

The relational graph data included in the time series data at time t is denoted as: $G_t=(V_t, E_t, X_t^v, X_t^e, Y_t)$ being the set of relational graph data at time t, where $V_t$ are the set of active vertices at time t, and $E_t$ represents the edges between that set. The vertex attributes at time t are denoted as $X_t^v$, whereas the set of attributes 14 that describe the edges between the vertices are denoted by $X_t^e$. Finally, we denote $Y_t$ as the set of class labels at time t.

The prediction task is to predict the label of a vertex vi at time t+1 denoted formally as Yt+1. More formally, the prediction task is as follows:

$$E(Y_{t+1}|G_t, G_{t-}, \ldots, G_p)$$

where $E(\cdot)$ is an arbitrary error measure, $Y_{t+1}$ is the vector of class labels at time t+1, and $\{G_1, G_{t-1}, \ldots, G_p\}$ is the set of relational time series data where $G_t=(V_t, E_t, X_t^v, X_t^e, Y_t)$. If classification at a different time point needs to be predicted, t+1 is replaced with an appropriate time point.

The weight that edges of each individual graphs has in the summary graph 23 depends on the processing kernel used for the smoothing. Thus, the graph summarization can be a graph smoothing operation:

$$G_t^S = \Sigma_{p=t-p}^t K(G_p, t, \theta),$$

where K is an appropriate kernel function with parameter for the relationships. In addition, p is the temporal lag (number of past time steps to consider) of graphs and attributes 14. Thus, p=∞ to indicate the lag for which all of available past information for the graphs and attributes 14 is used, whereas p=1 indicates that only the immediate past information is used during the smoothing.

Representing the summary operation through kernel smoothing allows the freedom to explore and choose a suitable weighing scheme from a wide range of kernel functions. This flexibility allows the classifier 22 to select the best kernel function that captures and exploit the temporal variations as necessary for particular classification tasks. While certain processing kernels are presented below, still other processing kernels can also be used.

One of the kernels that the classifier 22 can employ is the exponential kernel, which uses an exponential weighing scheme defined as:

$$K_E(G_p, t, \theta) = (1-\theta)^{t-p} \Theta W_p$$

The exponential kernel weighs the recent past highly and decays the weight rapidly as time passes. The kernel smoothing operation on the input temporal sequence $\{G_1, G_2, \ldots, G_t\}$ can also be expressed as a recursive computation on the weights $\{W_1, W_2, \ldots, W_t\}$ through time, meaning that the summary data at time t can be written as a weighted sum of the data at time t and the summary data at time (t−1) where the summary parameter $\theta \in [0,1]$ specifies the influence of the current time step and to is defined as the initial time step in the time window.

$$W_t^S = \begin{cases} (1-\theta)W_{t-1}^S + \theta W & \text{if } t > t_o \\ \theta W_t & \text{if } t = t_o \end{cases}$$

Alternatively, the classifier 22 can use the linear kernel to create the summary graph 23, the linear kernel defined as:

$$K_L(G_p, t, \theta) = \theta W_p \left( \frac{t_{max} - p + 1}{t_{max} - t_o + 1} \right)$$

where $t_{max}$ is defined as the final time step considered in the time window. The linear kernel decays more gently and retains the past information for a longer time. Again, the summary graph data at time t is the weighted sum of the edge data at time t and the summary edge data at time (t−1), and the summary parameter $\theta \in [0, 1]$ and is defined as:

$$W_t^S = \begin{cases} \left( \frac{t_{max} - t}{t_{max} - (t+1)} \right) W_{t-1}^S + \theta W_t & \text{if } t > t_o \\ \theta W_t & \text{if } t = t_o \end{cases}$$

The classifier 22 can also use an inverse linear kernel, which decays past information slower than the information kernel, but faster than the linear graph kernel. The inverse linear kernel is defined for the graph as:

$$K_I(G_p, t, \theta) = \theta W_p \left( \frac{1}{p - t_o + 1} \right),$$

with the weights of the summary graph 23 being recursively defined as $$W_t^S = \begin{cases} \left(\dfrac{t-t_o}{t-t_o+1}\right)W_{t-1}^S + \theta W_t & \text{if } t > t_o \\ \theta W_t & \text{if } t = t_o \end{cases}$$

Further, the classifier 22 does not have to consider all of the edges during all iterations of graph smoothing, and can prune some of the edges whose weight is determined to be below a certain sparsification threshold, as also described below with reference to FIGS. 5A-5C. Let ϵ be a threshold for graph sparsification. For example, ϵ can be set to equal $10^{-4}$, though other values are possible. In particular, after each iteration of graph smoothing, graph sparsification can be used to prune temporal edges with weights that are close to zero, as defined with respect to ϵ. That is, if $w_{ij} < \epsilon$ where $(v_i, v_j) \in E_t$, then $(v_i, v_j)$ is removed from the edge set $E_t$. This approach allows to balance time and space effectively, since over time the graph will become dense, with many edges with weights close to zero. The graph sparsification technique prunes these spurious and potentially noisy edges from consideration, reducing the space and storage requirements considerably, while also providing a more efficient processing method because a smaller number of edges are used in the computation (only the edges that are of significant temporal importance are used in the computation).

Once the classifier 22 creates the summary graph 23, the classifier 22 can use the graph 23 to predict the label 13 of the incoming data item at a future point of time.

In performing relational time series classification, the classifier 22 has to learn three main parameters: (1) the tightness of the similarity function σ, (2) the graph smoothing parameter, θ which controls the weight of the past graph information, and (3) the attribute smoothing parameters, λ, for weighing the collection of node attribute time series. The parameters are summarized in Table 2 below:

TABLE 2

Model parameters

| Symbol | Description |
| --- | --- |
| σ | controls the tightness of the similarity function |
| θ | graph smoothing parameter, controls the amount of past information used. The parameter is between 0 and 1. |
| λ | controls the amount of smoothing for the time series of node attributes |

The classifier 22 can learn the parameters by searching over a small set of reasonable parameter settings, and selecting the parameters that give the optimal accuracy/performance. In a further embodiment, the classifier can also choose to optimize some other functions, such as AUC, entropy, or based on the distribution of confidence scores. More specifically, let $\sigma \in \{0.001, 0.01, 0.1, 1, 10\}$, $\theta \in \{0, 0.1, 0.3, 0.5, 0.7, 0.9, 1\}$, and similarly for $\lambda \in \{0, 0.1, 0.3, 0.5, 0.7, 0.9, 1\}$, though in a further embodiment, other values of the parameters are also possible. The parameters can be searched as follows: first, the parameters for σ, θ, and λ initialized (e.g., using the first values from the above set of parameter values for which we will search), respectively. Once the parameters are selected, the time series of graph data $\{G_{t-1}, G_{t-2}, \ldots, G_{p-1}\}$ and $\{G_t, G_{t-1}, \ldots, G_p\}$ are used for training, with the objective of predicting the class label of the nodes at time t (which are known and observed). The parameters that maximize the previous objective function are then used for predicting the class labels of the nodes at time t+1. In other words, the parameters are tested using past temporal relational data and the parameters that result in the best accuracy are selected to predict the class labels at time t+1.

The one or more servers 18 can include components found in programmable computing devices, such as one or more processors, such a CPU or a GPU (graphic processing units) or both kinds of processors, which could be used together, memory, input/output ports, network interfaces, and non-volatile storage, although other components are possible. The CPU or GPU can have a single processing unit, such as a core, though other kinds of processing units are also possible, or multiple processing unit, with each processing unit being capable of executing a single processing unit. The servers can be in a cloud-computing environment or be dedicated servers. The servers 18 can each include one or more modules for carrying out the embodiments disclosed herein. The modules can be implemented as a computer program or procedure written as source code in a conventional programming language and that is presented for execution by the central processing unit as object or byte code. Alternatively, the modules could also be implemented in hardware, either as integrated circuitry or burned into read-only memory components, and each of the servers 18 can act as a specialized computer. For instance, when the modules are implemented as hardware, that particular hardware is specialized to perform the similarity score computation and other computers without the hardware cannot be used for that purpose. The various implementations of the source code and object and byte codes can be held on a computer-readable storage medium, such as a floppy disk, hard drive, digital video disk (DVD), random access memory (RAM), read-only memory (ROM) and similar storage mediums. Other types of modules and module functions are possible, as well as other physical hardware components.

While the system 10 of FIG. 1 is described as modeling relational dependencies, temporal dependencies, and temporal relational dependencies, in a further embodiment the system 10 may also utilize spatial dependencies to make a label 13 assignment. For instance, if two users represented by two data items 12, 20 are connected and also temporally relevant, they may also be correlated along the spatial dimension of the data items 12, 20 (such as with both users being located in the same city/country).

The system 10 of FIG. 1 can also construct an ensemble of predictors, which may improve performance of classification methods described below with reference to FIGS. 2-5. For instance, the servers 18 can adapt a decision tree learner, which can use a decision tree representation for weighting the features by the temporal influence of the edges and attributes, as described above and below, and a set of decision tree models can be learned sampling or randomization of the data representation. The use of the decision tree learner would provide decision tree models, such as random forests or bagged decision trees, which may be used for the prediction by averaging over the results given by the models.

Figure 2A:
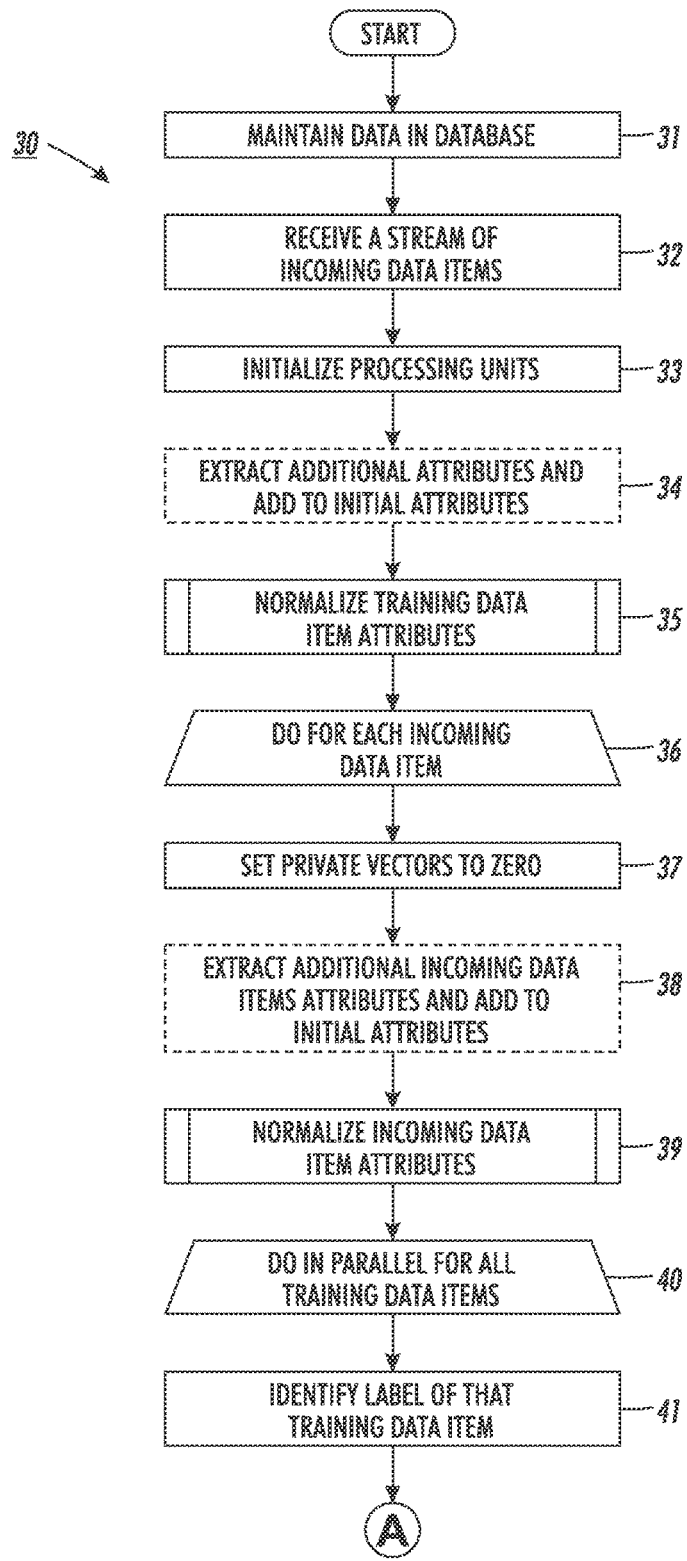
FIG. 2A-2B are flow diagrams showing a method for parallel maximum similarity classification in accordance with one embodiment.
Figure 2B:
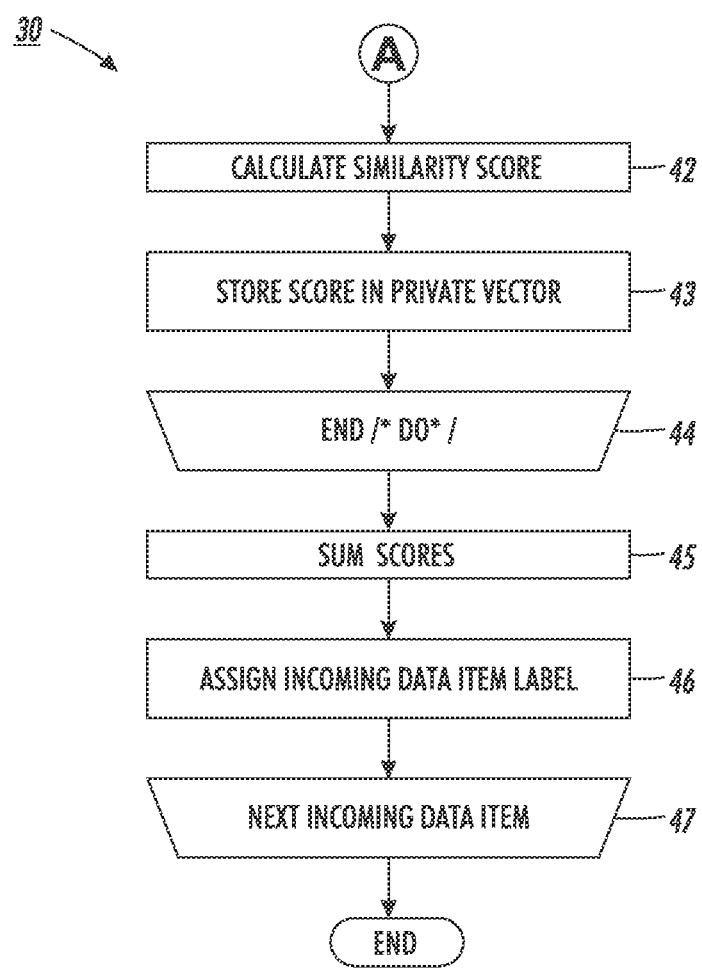

FIGS. 2A-2B are flow diagrams showing a method 30 for parallel maximum similarity classification in accordance with one embodiment. The method 30 can be implemented using the system 10 of FIG. 1. The training data items 12 are obtained, if not previously available, and maintained in the database 11 (step 31). The training data items 12 can be preexisting, such as being obtained during previous iterations of the method 30 or from another source. Alternatively, the training data items can be sampled from an incoming stream of unlabeled data items 20, identified as representative of the stream and receive a label, 13 as further described above with reference to FIG. 1. In a further embodiment, a subset of the complete training data item set that is representative of the set can be chosen to be used in the processing steps described below, as further described above with reference to FIG. 1.

A continuous stream of multiple incoming data items 20 is received (step 32). The stream can also be received at a different point of the method 30. For example, the stream can be received before the training data items are obtained and can remain open through the duration of the method 30.

A plurality of processing units are initialized for processing the training data items 12 and the incoming data items 20, each of the units associated with a private vector 24 c for storing similarity scores (33). As mentioned above, the private vectors 24 have a separate bin for every class label 13, with the bins being indexed by the class labels 13 and denoted as c(k), k=1 . . . , [L], with L being the number of classes. Optionally, additional attributes 14, features, are extracted for the training data items 12 and added to the initial attributes 14 to obtain the attributes of the training data items 12 (step 34). The attributes 14, either the attributes 14 known at the start of the method 30 or, if extracted in step 34, the extracted attributes 14 in addition to the initial attributes 14, are normalized, such as further described with reference to FIG. 6, though other normalization schemes are also possible, with the normalization being performed by the processing units working in parallel (step 35).

Following the normalization of the attributes 14 of the training data items 12, an iterative processing loop (steps 36-47) is started for each of the incoming data items 20 (step 36). The private vectors 24 for the processing units are set to 0 (step 37), preparing the vectors to store the similarity scores. Optionally, additional attributes 14 are extracted for that incoming data item 20 and are combined with the initial attributes 14 of that data item (step 38). The available attributes 14 are normalized (step 39), such as further described with reference to FIG. 6, though other normalization schemes are also possible. Following the normalization (step 39), all of the training data items 12 undergo concurrent processing through steps 40-44, with the processing being performed in parallel by the processing units (step 40). In one embodiment, each of the processing units computes a score for only one of the training data items 12; in a further embodiment, one processing unit may consecutively computes a score for more than one training data item 12. The label 13 of a training data item 12 processed by one of the units is identified (step 41) and a similarity score is calculated between that training data item and the incoming data item 20 that is currently being processed in the processing loop of steps 36-46 (step 42). The score is calculated using a similarity function, such as one of the functions described above with reference to FIG. 1. The calculated score is stored in the private vector 24 associated with the processing unit that performs the calculation (step 43), ending the concurrent processing (step 44).

Following the end of the concurrent processing, the scores for each label 13 on different private vectors are summed and stored into a storage vector 25 (step 45). The summation can be defined by the equation $(k)=\Sigma_p c_p(k)$, where p is the number of processing units. The summation is performed in parallel by the processing units, with one unit performing the summation and storage into the storage vector 25 of the scores for one of the labels 13. Thus, if multiple training data items 12 have the same label 13, the storage vector 25 stores the score for that label 13 that is the combined score for the training data items 12 that have that label 13. The label 13 that is associated with the highest similarity score is assigned to be the label 13 of the incoming data item being processed (step 46). Once the label 13 is assigned to the incoming data item 20, the processing moves to the next incoming data item 20 in the stream and the iterative processing loop returns to step 35 (step 47). Once all of the incoming data items have been processed through the steps 35-47, after the closing of the stream, the method 30 ends.

If an incoming data 20 has connections 15 to the training data items or to other incoming data items 20 which are in turn connected to the training data items 12, that incoming data can be classified using graph-based classification. FIGS. 3A-3B are flow diagrams showing a method 50 for graph-based classification via maximum similarity in accordance with one embodiment. The method 50 can be implemented using the system 10 of FIG. 1. The training data items 12 are obtained, if not previously available, and maintained in the database 11 (step 51). The training data items 12 can be preexisting, such as being obtained during previous iterations of the method 50 or from another source. Alternatively, the training data items can be sampled from an incoming stream of unlabeled data items 20, identified as representative of the stream and receive a label, as further described above with reference to FIG. 1. In a further embodiment, a smaller set of representative training data items 12 can be chosen to be used in the processing steps described below, as further described above with reference to FIG. 1.

A stream of multiple incoming data items 20 is received (step 52). The stream can also be received at a different point of the method 50. For example, the stream can be received before the training data items are obtained and can remain open through the duration of the method 50.

A graph(or an adjacency matrix representing the graph) is created that includes vertices representing the training data items 12 and those of the incoming data items 20 that are connected by the connections 15 to one or more of the training data items 12, with the connections 15 representing the edges of the graph 17 (step 53). In one embodiment, the graph is created once a certain number of the incoming data items 20 are received, and those data items 20 undergo subsequent processing. In a further embodiment, the creation of the graph would take place inside the loop of steps 56-67 described below and thus the graph would be updated for processing of each of the incoming data item 20 to include a vertex representing that incoming data item 20. A plurality of processing units are initialized for processing the training data items 12 and the incoming data items 20, each of the units associated with a private vector 24 c for storing similarity scores (step 54). As mentioned above, the private vectors 24 have a separate bin for every class label 13, with the bins being indexed by the class labels 13 and denoted as c(k), k=1 . . . , [L], with L being the number of classes. The attributes 14 of the training data items 12 are normalized, such as further described with reference to FIG. 6, though other normalization schemes are possible, with the normalization being performed by the processing units working in parallel (step 55).

Following the normalization of the attributes 14 of the training data items 12, an iterative processing loop (steps 56-67) is started for each of the incoming data items 20, with the incoming data items being processed one at a time (step 56). The private vectors 24 for the processing units are set to 0 (step 57), preparing the vectors to store the similarity scores. The attributes 14 of the incoming data item 20 are normalized, using techniques such as further described with reference to FIG. 6, though other normalization schemes are also possible (step 58). Following the normalization (step 58), those of the training data items represented by vertices in the graph that are within the k-hops from the vertex representing that incoming data item 20, are identified (59). The identified training data items 12 undergo concurrent processing through steps 60-64, with the processing being performed in parallel by the processing units (step 60). In one embodiment, each of the processing units processes only one of the training data items 12; in a further embodiment, one processing unit may consecutively process more than one training data item 12. The label 13 of a training data item 12 processed by one of the units is identified (step 61) and a similarity score is calculated between that training data item and the incoming data item 20 that is currently being processed in the processing loop of steps 56-67 (step 62). The similarity score is calculated using a similarity function, as described above with reference to FIG. 1. The calculated score is stored in the private vector 24 associated with the processing unit that performs the calculation (step 63), ending the concurrent processing (step 64).

Following the end of the concurrent processing, the scores for each label 13 in different private vectors 24 are summed and stored into a storage vector 25 (step 65). The summation can be defined by the equation $(k)=\Sigma_p c_p(k)$, where p is the number of processing units. The summation is performed in parallel by the processing units, with one unit performing the summation and storage into the storage vector 25 of the scores for one of the labels 13. Thus, if multiple training data items 12 have the same label 13, the storage vector 25 stores the score for that label 13 that is the combined score for the training data items 12 that have that label. The label 13 that is associated with the highest similarity score is assigned, to be the label 13 of the incoming data item being processed (step 66). Once the label 13 is assigned to the incoming data item 20, the processing moves to the next incoming data item 20 in the stream and the iterative processing loop returns to step 56 (step 67). Once all of the incoming data items have been processed through the steps 56-67, the method 50 ends. As mentioned above, in a further embodiment, the processing described above in relation to the graph could be performed to the adjacency matrix representing the graph.

Figure 4A:
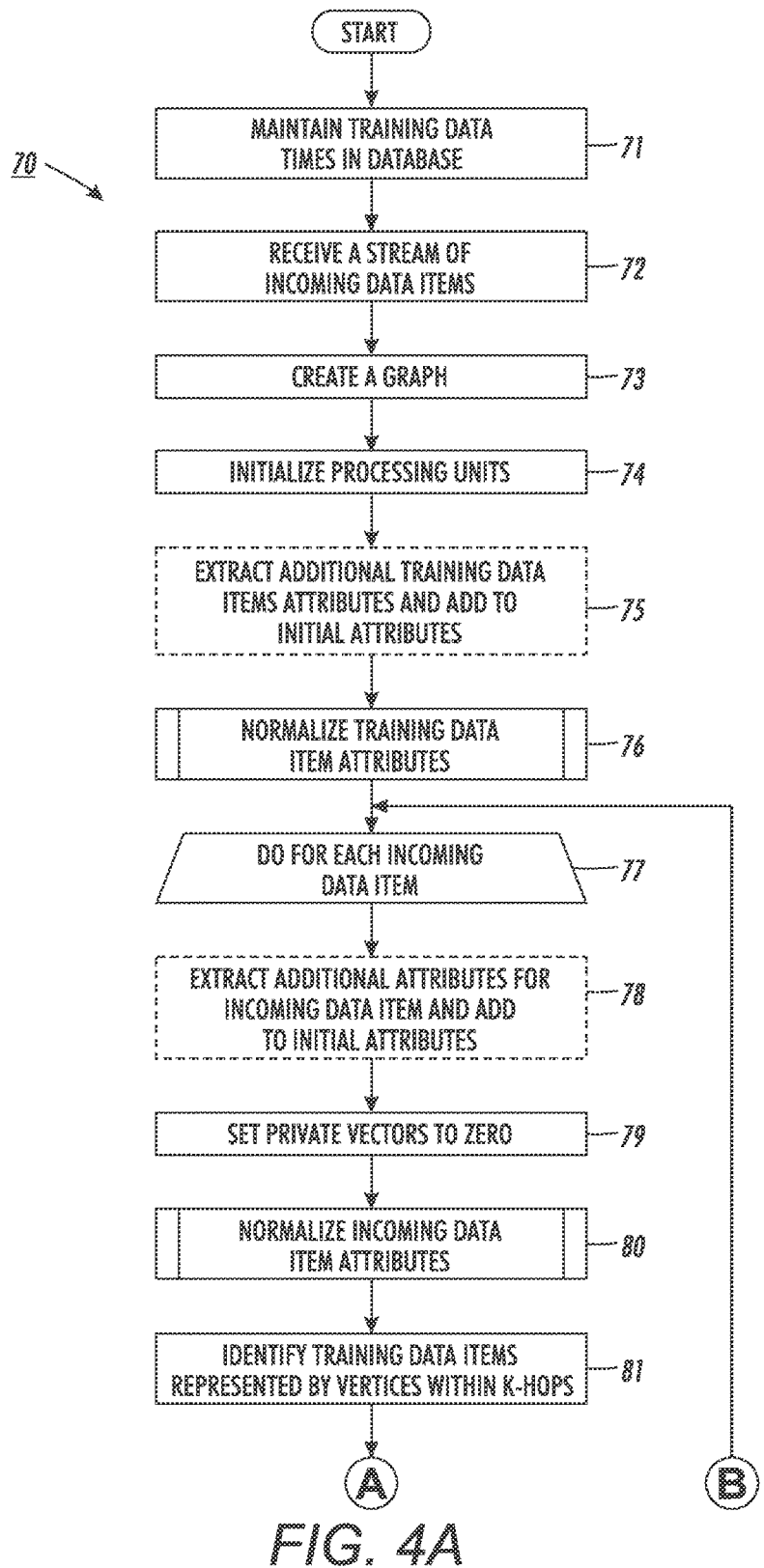
FIG. 4A-4B are flow diagrams showing a method for relational classification via maximum similarity in accordance with one embodiment.
Figure 4B:
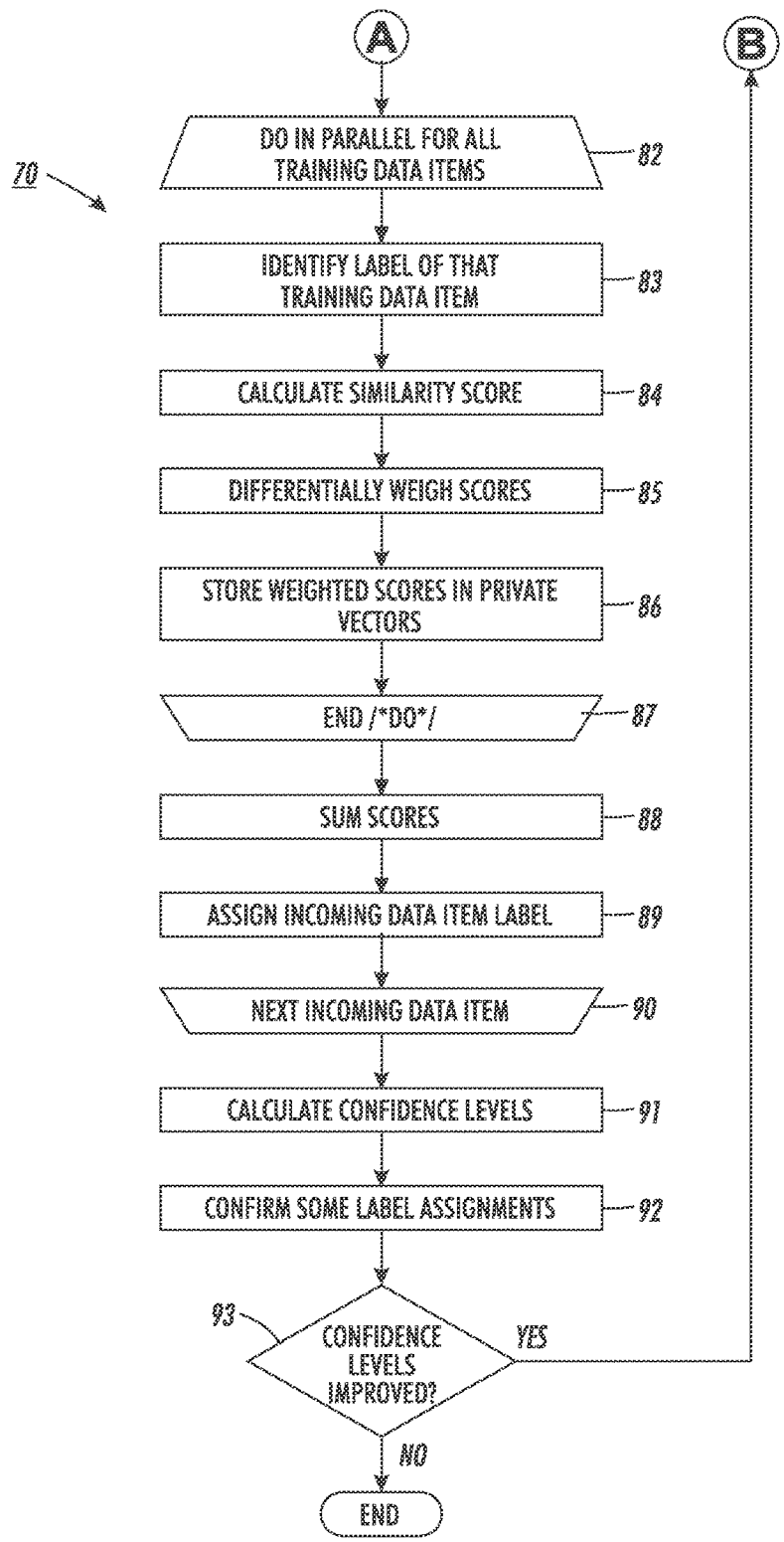

Relational data can be combined with graph data for classification purposes. FIGS. 4A-4B are flow diagrams showing a method 70 for relational classification via maximum similarity in accordance with one embodiment. The method 70 can be implemented using the system of FIG. 1. The training data items 12 are obtained, if not previously available, and maintained in the database 11 (step 71). The training data items 12 can be preexisting, such as being obtained during previous iterations of the method 70 or from another source. Alternatively, the training data items can be sampled from an incoming stream of unlabeled data items 20, identified as representative of the stream and receive a label, as further described above with reference to FIG. 1. In a further embodiment, a smaller set of representative training data items 12 can be chosen to be used in the processing steps described below, as further described above with reference to FIG. 1.

A stream of multiple incoming data items 20 is received (step 72). The stream can also be received at a different point of the method 70. For example, the stream can be received before the training data items 12 are obtained and can remain open through the duration of the method 70.

A graph (or the adjacency matrix representing the graph) is created that includes that includes vertices representing the training data items 12 and those of the incoming data items that are connected by the connections 15 to one or more of the training data items 12, with the connections 15 representing the edges of the graph (step 73). In one embodiment, the graph is created once a certain number of incoming data items 20 are received, and those data items 20 undergo subsequent processing. In a further embodiment, the creation of the graph would take place inside the loop of steps 77-90 described below and thus the graph would be updated for processing of each of the incoming data item 20 to include a vertex representing that incoming data item 20. A plurality of processing units are initialized for processing the training data items 12 and the incoming data items 20, each of the units associated with a private vector 24 c for storing similarity scores (step 74). As mentioned above, the private vectors 24 have a separate bin for every class label 13, with the bins being indexed by the class labels 13 and denoted as c(k), k=1 . . . , [L], with L being the number of classes. Additional attributes 14, features, are extracted from the training data items 12 and added to the initial attributes 14 to obtain the attributes of the training data items 12 (step 75). The complete set of attributes 14 are normalized, such as further described with reference to FIG. 6, though other normalization schemes are possible, with the normalization being performed by the processing units working in parallel (step 76).

An iterative processing loop (steps 77-90) is started for each of the incoming data items 20, with the incoming data items being processed one at a time (step 77). Additional attributes are also extracted for the incoming data item 20 being processed and is added to the initial attributes 14 of the incoming data item 20, creating the total set of attributes 14 that will be processed(step 78). The private vectors 24 for the processing units are set to be vectors of zeros (step 79), preparing the vectors to store the similarity scores. The attributes 14 of the incoming data item 20 are normalized, using techniques such as further described with reference to FIG. 6, though other normalization schemes are also possible (step 80). Following the normalization (step 80), those of the training data items represented by vertices in the graph that are within the k-hops from the vertex representing that incoming data item 20, are identified (81). All of the training data items 12 undergo concurrent processing through steps 82-87, with the processing being performed in parallel by the processing unit (step 82). In one embodiment, each of the processing units processes only one of the training data items 12; in a further embodiment, one processing unit may consecutively process more than one training data item 12. The label 13 of a training data item 12 processed by one of the units is identified (step 83) and a similarity score is calculated between that training data item and the incoming data item 20 that is currently being processed in the processing loop of steps 78-90 (step 84). The similarity score is calculated using a similarity function, such as described above with reference to FIG. 1.

The similarity score calculated for that training data item 12 is weighed (step 85), with the score being assigned a greater weight if the training data item 12 is identified as represented by the vertex within the k-hops of the vertex representing the incoming data item 20 being processed and a lesser weight if the training data item 12 is not represented by the training data item within the k-hops. For example, as part of the weighing, similarity score for the training data items represented by vertices within the k-hops can be multiplied by a real number, denoted as $\alpha$, $\alpha \leq 1$; likewise, the similarity score for the training data items that are represented by the vertices not within the k-hops are multiplied by $(1-\alpha)$. If $\alpha$ is 1, the similarity scores of the training data items not within the k-hops, are not taken into account. Other ways to weigh the scores are possible.

The weighted similarity scores is stored in the private vector 24 associated with the processing unit that performs the calculation (step 86), ending the concurrent processing (step 87).

Following the end of the concurrent processing, the scores for each label 13 in different private vectors 24 are summed and stored into a storage vector 25 (step 88). The summation can be defined by the equation $(k)=\Sigma_p c_p(k)$, where p is the number of processing units. The summation is performed in parallel by the processing units, with one unit performing the summation and storage into the storage vector 25 of the scores for one of the labels 13. Thus, if multiple training data items 12 have the same label 13, the storage vector 25 stores the score for that label 13 that is the combined score for the training data items 12 that have that label. The label 13 that is associated with the highest similarity score is assigned to be the label 13 of the incoming data item being processed (step 89). Once the label 13 is assigned to the incoming data item 20, the processing moves to the next incoming data item 20 in the stream and the iterative processing loop returns to step 78 (step 90).

As described above with reference to FIG. 1, in a further embodiment, collective classification can be performed using the same data as relational classification per method 70. Thus, while the method 70 could end after all the incoming data items 20 are processed through the steps 78-90, optionally, additional steps for performing collective classification could be included in the method 70. In particular, a confidence level can be calculated for each of the label assignments, as described above with reference to FIG. 1 (step 91). A certain number of label assignments with the highest confidence level, such as 10% with the highest confidence level, are confirmed and set as training data items 12 for the purpose of processing the unlabeled data items (step 92). A different portion of the assigned labels 13 can also be confirmed. Whether the confidence levels for the remaining data items have improved from the last iteration of the steps 90-93 is determined in step 93. If the levels have improved (step 93), the method 70 returns to step 78 for processing of the remaining incoming data items 70 and the labels of these data items are determined again as described above with reference to steps 78-92. If the levels have not improved (step 93), the method 70 ends. During the first iteration of step 93, when there is no previous confidence levels available for comparison, the method 70 returns step 78 for all of the remaining data items following completion of step 92. As mentioned above, in a further embodiment, the processing described above in relation to the graph could be performed to the adjacency matrix representing the graph.

Combining relational data with time series data allows to predict the classification of a data item during one or more future time points. While method 100 described with reference to FIGS. 5A-5C is described with reference to predicting the data item at the next future time point, t+1, the prediction can also be made for another time point in the future. FIGS. 5A-5C are flow diagrams showing a method 100 for relational time series learning in accordance with one embodiment. The method 100 can be implemented using the system 10 of FIG. 1. The training data items 12 are maintained in the database 11, each of the training data items associated with time series data 16 describing the connections 15 and the attributes 14 of those training data items through a plurality of time points (step 101). The training data items and the associated data can be preexisting, such as being obtained during previous iterations of the method 100 or from another source. Alternatively, the training data items can be sampled from an incoming stream of unlabeled data items 20, identified as representative of the stream and receive a label, as further described above with reference to FIG. 1. In a further embodiment, a smaller set of representative training data items 12 can be chosen to be used in the processing steps described below, as further described above with reference to FIG. 1.

A stream of multiple incoming data items 20 is received, the received training data items 20 also associated with the time series data 16 (step 102). The stream can also be received at a different point of the method 30. For example, the stream can be received before the training data items are obtained and can remain open through the duration of the method 100.

A plurality of processing units are initialized for processing the training data items 12 and the incoming data items 20, each of the units associated with a private vector 24 for storing similarity scores (step 103). A plurality of adjacency matrices 16 are obtained that correspond to the graphs 17 of the training data items 12 and the incoming data items 20 through the plurality of time points, with the matrices being denoted using the letter A (step 104). The time points define a temporal window of relevant data that needs to be processed to predict a label 13 useful for a particular application. Such a window may be long, such as covering weeks, months or years, for applications where data remains relevant for a long time, and short for applications where the data remains relevant only for a short period of time, coverings spans of seconds, minutes, or days.

The adjacency matrices are indexed based on the age of the time point with which they are associated, with the index being shown as p, the temporal lag defined above with reference to FIG. 1.

Additional attributes 14 are extracted for each of all of the training data items 12 and the incoming data points 12 included in each of the adjacency matrices, based on the existing attributes 14 of each of the data items 12, 20 at that point and are added to the initial attributes, creating the set of attributes that is used for subsequent processing (step 105). Thus, the additional attributes are created for each of the training data items 12 and the incoming data items at each of the time points to which the adjacency matrices correspond based on the initial attributes 14 of the data items at that time point.

Optionally, if the optimal parameters are not initially available, a plurality of parameters are identified for processing the matrices and calculating the similarity scores, the parameters being $\sigma$, $\theta$, $\lambda$, defined above, as described above with reference to FIG. 1 (step 106). Briefly, an initial set of parameters is chosen. Once the parameters are selected, the time series of graph data $\{G_{t-1}, G_{t-2}, \ldots, G_{p-1},\}$ and the time series of $i\{G_t, G_{t-1}, \ldots, G_p,\}$ are used for training of the parameters for testing, with the objective of predicting the class label of the nodes at time t (which are known and observed). The parameters that maximize the previous objective function are then used for predicting the class labels of the nodes at time t+1 or another future point using the description below.

The adjacency matrix representing the earliest data being processed, the earliest data relevant to the temporal window, is denoted as $A_1$, and set as $A_1^S$, an adjacency matrix representing the summary graph 23:: $A_1^S=A_1$ (step 107). An iterative processing loop is then started for all adjacency matrices indexed p=2 to t, where t represents the most recent available time point (step 108). A smoothing of one of the adjacency matrices 26 is performed using a processing kernels, such as those described above with reference to FIG. 1, though other processing kernels can also be used, and the result is set as part of the adjacency matrix for the summary graph 23: $A_1^S=K(A_p, A_{p-1}^S, \theta)$ (step 109). Graph sparsification is performed on the matrix, $A_{p-1}^S$, removing data corresponding to edges of the summary graph 23 whose weigh falls below a particular threshold, such as described above with reference to FIG. 1 (step 110). Following the sparsification, the loop moves to the next value of p (step 111). Once all of the values of p have been processed through the loop, the same kernel used to perform the summary graph 23 creation is then used to smooth the attributes 14 of all of the training data items and the incoming data items 20 represented in the adjacency matrices through all of the time points (112). The smoothed attributes of the training data items are normalized, using any suitable normalization techniques, such as further described with reference to FIG. 6, though other normalization schemes are possible, with the normalization being performed by the processing units working in parallel (step 113). In one embodiment, the adjacency matrices can be obtained after a certain number of incoming data items 20 are received and the received data items are represented in the matrices (and thus undergo subsequent processing through the method 100). In a further embodiment, the matrices can be updated upon arrival of each of the incoming data item, and steps 104-113 described below can be performed inside the processing loop 114-126, resulting in a new summary graph 23 that is used for processing of each of the data items 20.

An iterative processing loop (steps 114-126) is started for each of the incoming data items 20, with the incoming data items being processed one at a time (step 114). The private vectors 24 for the processing units are set to be vectors of zeros (step 115), preparing the vectors to store the similarity scores. The attributes 14 of the incoming data item 20 are normalized, using techniques such as further described with reference to FIG. 6, though other normalization schemes are also possible (step 116). Following the normalization (step 116), those of the training data items represented by vertices in the graph that are within the k-hops from the vertex representing that incoming data item 20 in the summary graph are identified (117). All of the training data items 12 undergo concurrent processing through steps 118-123, with the processing being performed in parallel by the processing unit (step 118). In one embodiment, each of the processing units processes only one of the training data items 12; in a further embodiment, one processing unit may consecutively process more than one training data item 20. The label 13 of a training data item 12 processed by one of the units is identified (step 119) and a similarity score is calculated between that training data item and the incoming data item 20 that is currently being processed in the processing loop of steps 114-126 (step 120). The score is calculated using a similarity function, such as described above with reference to FIG. 1.

The similarity score calculated for that training data item 12 is weighed (step 121), with the score being assigned a greater weight if the training data item 12 is identified as represented by the vertex within the k-hops of the vertex representing the incoming data item 20 being processed and a lesser weight if the training data item 12 is not represented by the training data item within the k-hops. One way possible way to weigh the data items is described above with reference to FIG. 4A-4B. Other ways to weigh the scores are possible.

The weighted similarity scores is stored in the private vector 24 associated with the processing unit that performs the calculation (step 122), ending the concurrent processing (step 123).

Following the end of the concurrent processing, the scores for each label 13 on different private vectors 24 are summed and stored into a storage vector 25 (step 124). The summation can be defined by the equation $(k)=\Sigma_p c_p(k)$, where p is the number of processing units, and is performed as described above with reference to FIG. 4A-4B. The label 13 that is associated with the highest similarity score is predicted to be the label 13 of the incoming data item being processed at a future time point as well as the present label 13 of that data item 20 (step 125). Once the label 13 is predicted to the incoming data item 20 at a desired data point, such as t+1, the processing moves to the next incoming data item 20 in the stream and the iterative processing loop returns to step 114 (step 126). Once all of the incoming data items have been processed through the steps 114-126, the method 100 can end. In a further embodiment, optionally, additional steps can be included in the method 100. Thus, a confidence of each of the assignments can be calculated, such as using techniques described above with reference to FIG. 1, though any other confidence measure could also be used (step 127). A certain number of label predictions meeting a confidence threshold can be confirmed (128). The label predictions of the remaining incoming data items 20 can then be determined, such as by repeating the processing of steps 114-126 on the incoming data items 20 by using calculating similarity to the newly-labeled data items (step 129), ending the method 100.

Depending on how long data remains relevant in a particular field, the assignment of a label 13 to a data item using any of the methods described above with reference to FIGS. 2-5 can also predict the label 13 of that data item for a certain amount of time in the future. In particular, the method described below with reference to FIG. 5A-5C, which take into account the age of the data used to make the assignment, is particularly suited for making the prediction in the future at the same time as assigning the present label 13.

Figure 6:
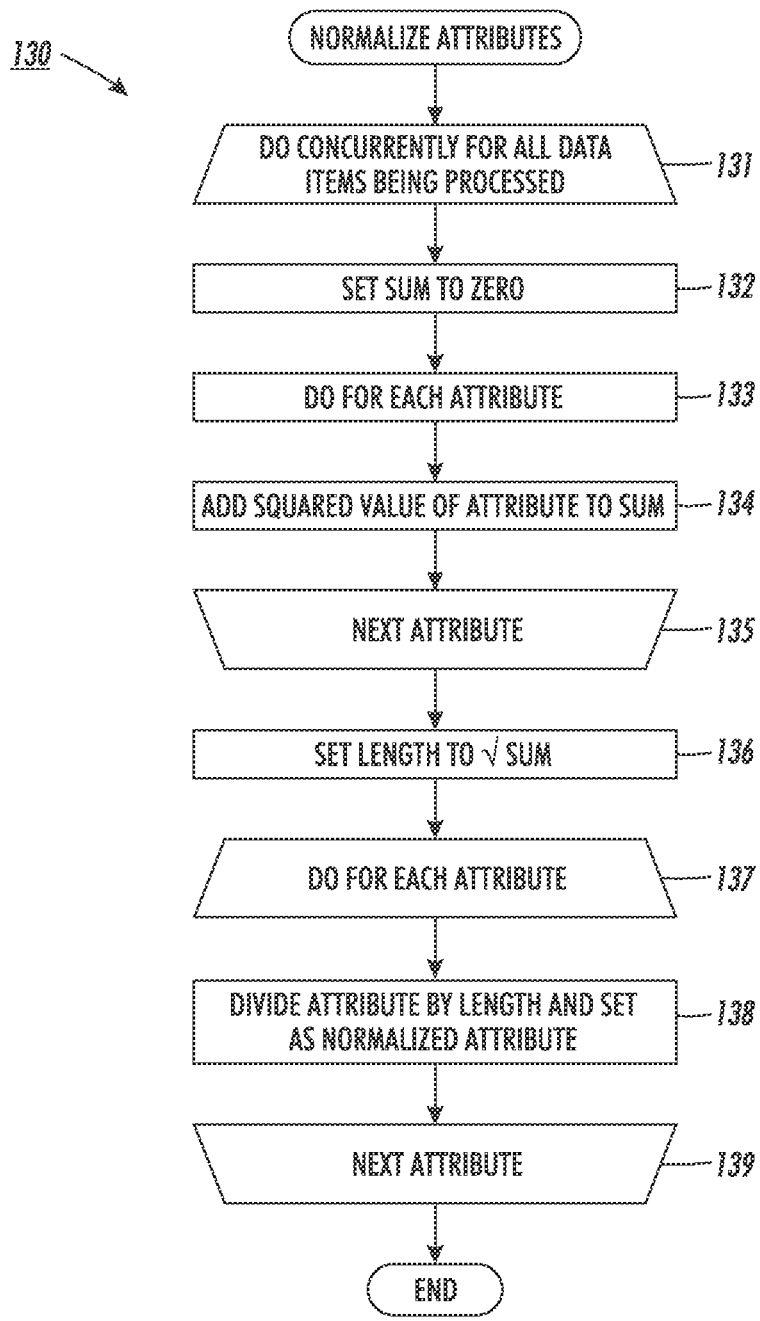
FIG. 6 is a flow diagram showing a routine 130 for normalizing attributes of data items for use in the methods of FIGS. 2-5, in accordance with one embodiment.

The normalization of attributes 14 allows attributes 14 from the training 12 and incoming data items 20 to be comparable to each other. FIG. 6 is a flow diagram showing a routine 130 for normalizing attributes 14 of data items 12, 20 for use in the methods 30, 50, 70, 100 of FIGS. 2-5 in accordance with one embodiment. The routine 130 can be performed to analyze the attributes 14 of either incoming 20 or training data items 12. The routine 130 is given as an example of a possible normalization routine and other normalization routines can also be used. Concurrent processing is started for each data item 12, 20 whose attributes are being processed (step 131). A sum of the weights of the attributes 14 of the data items 12, 20 is initialized and set to zero (step 132). An iterative processing loop 135 is started for each attribute of that data item, attributes being index from 1 to f, and being processed through the loop one at a time (step 133). The squared value of that attribute 14, denoted as $x^2_{ij}$, is added to the sum (step 134), and the loop 133-135 moves to the next attribute 14 (step 135). Once all of the attributes 14 of the data item have been processed, a variable called unit length is set to a square root of the sum (step 136). An iterative processing loop 137-139 is started for the attributes 14 of the data item 12,20 being processed, with the attributes 14 being processed through the loop 137-139 one at a time (step 137). The value of that attribute is divided by the length and set as the normalized attribute for that data item 12, 20 (step 138). The iterative loop 137-139 moves to the next attribute 14. Once the concurrent processing 131-139 of all of the data items being processed is complete, the routine 130 ends.

While the invention has been particularly shown and described as referenced to the embodiments thereof, those skilled in the art will understand that the foregoing and other changes in form and detail may be made therein without departing from the spirit and scope of the invention.

What is claimed is:

1. A computer-implemented method for parallel maximum similarity classification, comprising:
    maintaining a plurality of training data items, each of the training data items associated with one of a plurality of labels;
    receiving an incoming stream comprising one or more unlabeled data items;
    normalizing attributes of a plurality of training data items;
    processing at least one of the unlabeled data items using a plurality of processing units executed by one or more processors, each of the units associated with a private vector, comprising:
        initializing the private vectors;
        normalizing attributes of the received data item;
        calculating in parallel by the processing units a similarity score between the unlabeled data item and one or more of the training data items using a similarity function and storing each of the scores into the private vector associated with each of the processing units;
        summing the scores from all of the private vectors into a storage vector; and
        assigning the label associated with the largest score as the label of the unlabeled data item.

2. A method according to claim 1, wherein the similarity function is one of a radial basis function and polynomial function.

3. A method according to claim 1, wherein the similarity score is calculated between the unlabeled data item and each of the training data items.

4. A method according to claim 1, further comprising:
    creating a representation of a graph comprising a plurality of vertices, each of the vertices representing one of one of the unlabeled data items and one of the training data items; and
    identifying those of the training data items whose representations are within k-hops of the representations of each of the data items,
    wherein the similarity score is calculated between each of the unlabeled data items and the identified data items whose representations are within the k-hops from that data item.

5. A method according to claim 1, further comprising:
    maintaining a matrix comprising rows representing the training data items and columns representing the attributes of the training data items;
    maintaining a second matrix comprising rows representing one or more of the incoming data items and columns representing the attributes of the incoming data items; and
    using the matrices for the classification.

6. A method according to claim 5, wherein each of the processing units processes a block of the training data item matrix.

7. A method according to claim 1, further comprising:
    deriving additional attributes for each of the training data items based on the initial attributes and adding the additional attributes to the initial attributes to obtain the attributes of the training data items; and
    deriving additional attributes of that unlabeled data item based on the initial attributes of that unlabeled data item and adding the additional attributes to the initial attributes to obtain the attributes of that unlabeled data item.

8. A method according to claim 1, further comprising:
    sampling one or more unlabeled data items from the stream;
    identifying the sampled data items that are representative of characteristics of the stream;
    assigning one of the labels to each of the identified sampled data items; and
    setting the labeled sample data items as the training data items.

9. A computer-implemented method for relational classification via maximum similarity, comprising:
    receiving an incoming stream comprising one or more unlabeled data items, each associated one or more initial attributes;
    maintaining a plurality of training data items, each of the training data items associated with one of a plurality of labels and associated with one or more initial attributes;
    deriving additional attributes for each of the training data items based on the initial attributes;
    adding the additional attributes to the initial attributes to obtain attributes of the training data items;
    normalizing the attributes of the plurality of the training data items;
    creating a graph comprising a plurality of vertices, each of the vertices representing one of the unlabeled data items and the training data items;
    processing at least one of the unlabeled data items using a plurality of processing units executed by one or more processors, each of the units associated with a private vector, comprising:
        identifying those of the training data items whose representations are within k-hops of the representations of that unlabeled data item;
        initializing the private vectors;
        deriving additional attributes of that unlabeled data item based on the initial attributes of that unlabeled data item;
        adding the additional attributes to the initial attributes to obtain attributes of that unlabeled data item;
        normalizing attributes of the unlabeled data item;
        calculating in parallel by the processing units a similarity score between the unlabeled data item and each of the training data items using a similarity function and storing each of the scores into the private vector associated with each of the processing units;
        weighing the similarity scores, wherein the similarity scores between that unlabeled data item and those of the training data items that are within the k-hops of that unlabeled data item are weighed heavier than the similarity scores between that incoming data item and those of that are training data items that are not within the k-hops;
        summing the weighed scores from all of the private vectors into a storage vector; and
        assigning the label associated with the largest score as the label of the unlabeled data item.

10. A method according to claim 9, comprising:
    calculating a confidence level for each of the label assignments;

selecting a portion of the incoming data items associated the label assignment with the confidence level exceeding a threshold; and confirming the label assignments for the selected data items and setting the data items with the confirmed labels as additional training data items; and revising the assignment of the labels to the remaining unlabeled data items using the additional training data items.

11. A method according to claim 9, wherein the similarity function is one of a radial basis function and polynomial function.

12. A method according to claim 9, further comprising:
sampling one or more unlabeled data items from the stream;
identifying the sampled data items that are representative of characteristics of the stream;
assigning one of the labels to each of the identified sampled data items; and
setting the labeled sample data items as the training data items.

13. A method according to claim 9, further comprising:
maintaining a matrix comprising rows representing the training data items and columns representing the attributes of the training data items;
maintaining a second matrix comprising rows representing one or more of the incoming data items and columns representing the attributes of the incoming data items; and
using the matrices for the classification,
wherein each of the processing units processes a block of the training data item matrix.

14. A computer-implemented method for relational time-series learning, comprising:
receiving an incoming stream comprising one or more unlabeled data items, each associated with data regarding initial attributes of the unlabeled data items and connections of the unlabeled data items at a plurality of time points;
maintaining a plurality of training data items, each associated with data regarding initial attributes of that training data item and connections of that training data items at the plurality of the time points;
obtaining a plurality of adjacency matrices, each of the matrices representing a graph comprising a plurality of vertices connected by one or more edges, each of the vertices representing one of the unlabeled data items and the training data items, each of the graphs further representing the connections between the training data items and the unlabeled data items at one of the time points;
associating a weight with each of the edges of each of the graphs based on the time point associated with that graph and combining the representations of the graphs with the weighted edges to create a representation of a summary graph;
deriving additional attributes for each of the training data items at each of the time points based on the initial attributes of that training data items at that time point;
adding the additional attributes of each of the training data items to the initial attributes of that training data item to obtain attributes of that training data item at each of the time points;
deriving additional attributes for each of the unlabeled data items at each of the time points based on the initial attributes of that training data items at that time point;
adding the additional attributes of each of the unlabeled data items to the initial attributes of that unlabeled data item to obtain attributes of that unlabeled data item at each of the time points;
smoothing the attributes of the training data items and the unlabeled data items for all of the time points;
normalizing the smoothed attributes of the training data items;
identifying those of the training data items whose representations are within k-hops of the representations of each of the data items in the summary graph;
processing at least one of the unlabeled data items using a plurality of processing units executed by one or more processors, each of the units associated with a private vector, comprising:
initializing the private vectors;
normalizing attributes of the unlabeled data item;
calculating in parallel by the processing units a similarity score between the unlabeled data item and one or more of the identified training data items using a similarity function and storing each of the score into the private vector associated with each of the processing units;
weighing the similarity scores, wherein the similarity scores between that unlabeled data item and those of the training data items that are within the k-hops of that unlabeled data item are weighed heavier than the similarity scores between that unlabeled data item and those of that are training data items that are not within the k-hops;
summing the weighted scores from all of the private vectors into a storage vector; and
predicting the label associated with the incoming data item based on the scores associated with the label at a future point of time.

15. A method according to claim 14, wherein the weighing of the edges is performed using one of an exponential processing kernel, a linear processing kernel, and an inverse linear processing kernel.

16. A method according to claim 14, further comprising:
calculating a confidence level for each of the label assignments;
selecting a portion of the incoming data items associated the label assignment with the confidence level exceeding a threshold; and
confirming the label assignments for the selected data items and setting the data items with the confirmed labels as additional training data items; and
revising the assignment of the labels to the remaining unlabeled data items using the additional training data items.

17. A method according to claim 14, further comprising:
comparing the weight of each the graph edges to a threshold; and
excluding those of the edges whose weight does not meet the threshold from the graph associated with the edges prior to the processing of each of the unlabeled data items.

18. A method according to claim 14, further comprising:
setting a plurality of initial parameters, the parameters comprising a tightness parameter for the similarity function, a parameter for weighing the edges of the graphs, and a parameter for weighing the attributes;
optimizing the parameters using one of the plurality of the graphs; and using the optimized parameters to create the summary graph, calculate the similarity scores, and calculate the weights.

19. A method according to claim 14, further comprising:

sampling one or more unlabeled data items from the stream;

identifying the sampled data items that are representative of characteristics of the stream;

assigning one of the labels to each of the identified sampled data items; and setting the labeled sample data items as the training data items.

20. A method according to claim 14, wherein the similarity function is one of a radial basis function and polynomial function.

* * * * *